(12) United States Patent
Panaitopol et al.

(10) Patent No.: US 9,877,261 B2
(45) Date of Patent: Jan. 23, 2018

(54) COMMUNICATION SYSTEM

(71) Applicant: NEC Corporation, Tokyo (JP)

(72) Inventors: Dorin Panaitopol, Berkshire (GB); Christophe Le Thierry D'Ennequin, Berkshire (GB); Benoit Lecroart, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/774,062

(22) PCT Filed: Mar. 6, 2015

(86) PCT No.: PCT/JP2015/057399
§ 371 (c)(1),
(2) Date: Sep. 9, 2015

(87) PCT Pub. No.: WO2015/141565
PCT Pub. Date: Sep. 24, 2015

(65) Prior Publication Data
US 2016/0381620 A1 Dec. 29, 2016

(30) Foreign Application Priority Data

Mar. 19, 2014 (GB) .................................. 1404961.3

(51) Int. Cl.
*H04B 7/14* (2006.01)
*H04W 28/02* (2009.01)
(Continued)

(52) U.S. Cl.
CPC .............. *H04W 40/22* (2013.01); *H04B 7/14* (2013.01); *H04L 47/627* (2013.01);
(Continued)

(58) Field of Classification Search
None
See application file for complete search history.

(56) References Cited

U.S. PATENT DOCUMENTS

| 2005/0048914 A1 | 3/2005 | Sartori et al. |
| 2007/0072604 A1 | 3/2007 | Wang |

(Continued)

FOREIGN PATENT DOCUMENTS

| CN | 101998520 A | 3/2011 |
| CN | 103634812 A | 3/2014 |

(Continued)

OTHER PUBLICATIONS

International Search Report and Written Opinion dated Jun. 19, 2015 in corresponding PCT International Application.

(Continued)

*Primary Examiner* — Chi H Pham
*Assistant Examiner* — Soon-Dong D Hyun
(74) *Attorney, Agent, or Firm* — Finnegan, Henderson, Farabow, Garrett & Dunner L.L.P.

(57) ABSTRACT

A communication system (1) is disclosed in which a core network node (11) generates configuration data including a first parameter for controlling data throughput (such as an aggregate maximum bit rate value) for a relaying user device (3-2) in dependence on whether or not the relaying user device (3-2) has a relaying connection with another user communication device (3-1, 3-3). The core network node (11) transmits the generated configuration data to another network node (5, 14) for managing communications with the relaying user device (3-2).

56 Claims, 14 Drawing Sheets

(51) Int. Cl.
*H04W 40/22* (2009.01)
*H04W 76/02* (2009.01)
*H04W 40/02* (2009.01)
*H04L 12/863* (2013.01)
*H04W 88/04* (2009.01)
*H04W 24/04* (2009.01)
*H04W 88/12* (2009.01)

(52) U.S. Cl.
CPC ....... *H04W 28/0257* (2013.01); *H04W 40/02* (2013.01); *H04W 76/023* (2013.01); *H04W 24/04* (2013.01); *H04W 76/02* (2013.01); *H04W 88/04* (2013.01); *H04W 88/12* (2013.01)

(56) References Cited

U.S. PATENT DOCUMENTS

| | | |
|---|---|---|
| 2007/0153698 A1 | 7/2007 | Lee et al. |
| 2008/0285501 A1 | 11/2008 | Zhang et al. |
| 2013/0059583 A1* | 3/2013 | Van Phan ........... H04W 76/023 455/435.1 |
| 2013/0159522 A1* | 6/2013 | Hakola ................ H04W 4/005 709/225 |
| 2013/0329711 A1* | 12/2013 | Seo ....................... H04J 11/0069 370/336 |
| 2014/0235248 A1* | 8/2014 | Chai .................... H04W 76/023 455/436 |
| 2014/0243039 A1* | 8/2014 | Schmidt .............. H04W 76/023 455/552.1 |
| 2015/0098410 A1* | 4/2015 | Jongren ................ H04L 1/0026 370/329 |
| 2016/0007257 A1* | 1/2016 | Kim .................... H04W 76/064 370/331 |
| 2016/0007336 A1* | 1/2016 | Fukuta ................ H04W 52/383 455/426.1 |
| 2016/0286459 A1* | 9/2016 | Enomoto .............. H04W 8/005 |

FOREIGN PATENT DOCUMENTS

| | | |
|---|---|---|
| EP | 1 804 441 A1 | 7/2007 |
| JP | 2013-143588 | 7/2013 |

OTHER PUBLICATIONS

Search Report dated Aug. 27, 2014 by the UK Patent Office in counterpart UK Patent Application No. GB1404961.3.

* cited by examiner

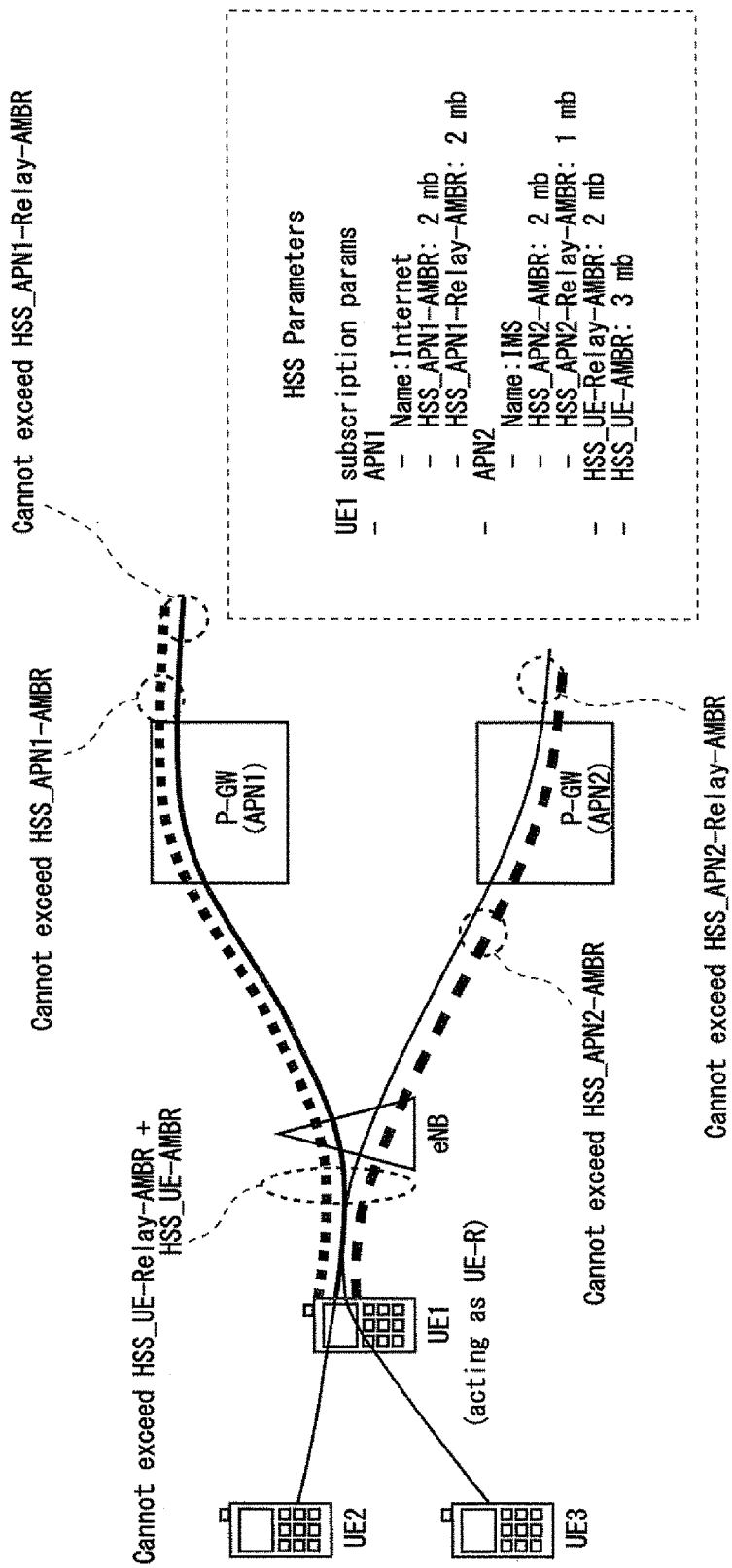

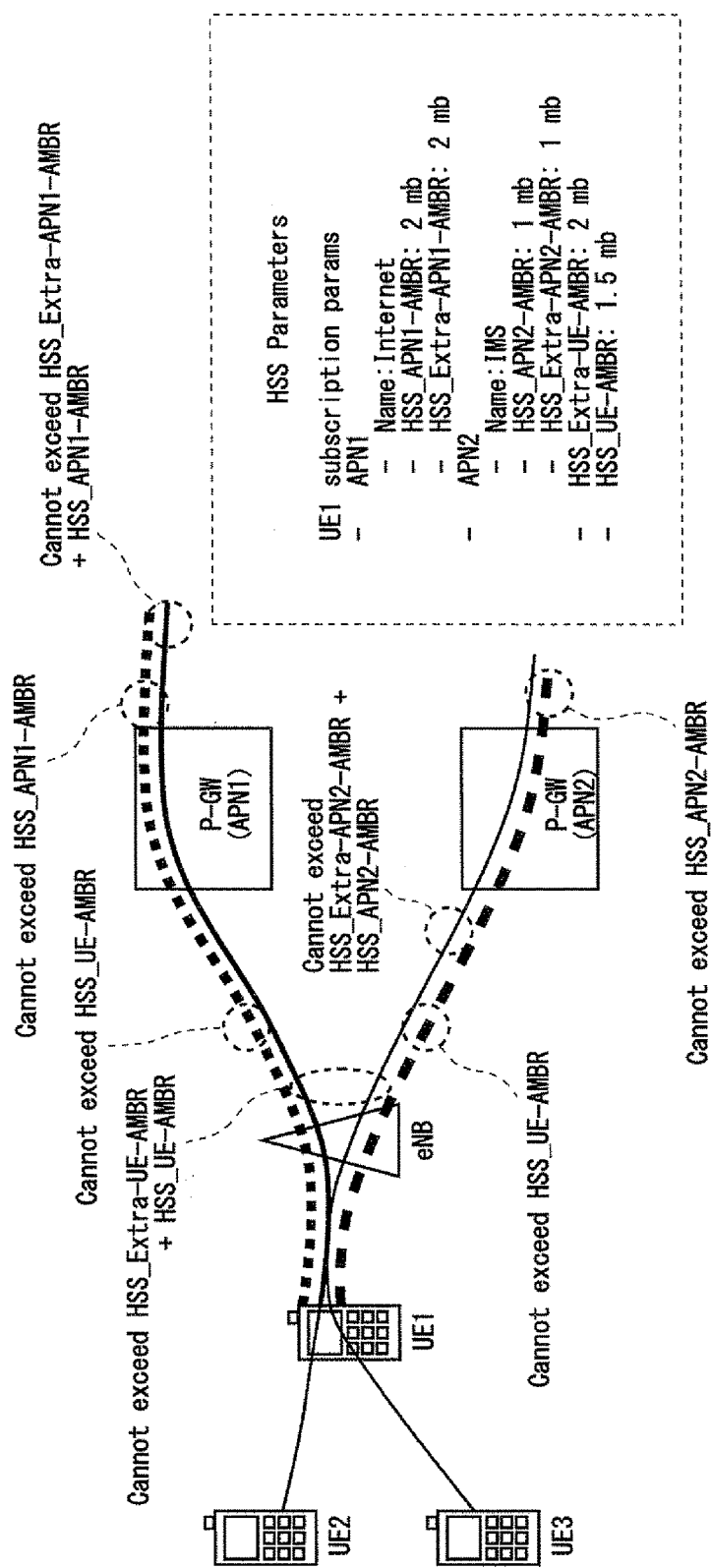

COMMUNICATION SYSTEM

CROSS-REFERENCE TO RELATED PATENT APPLICATIONS

This application is a National Stage Entry of International Application No. PCT/JP2015/057399, filed Mar. 6, 2015, which claims priority from British Patent Application No. 1404961.3, filed Mar. 19, 2014. The entire contents of the above-referenced applications are expressly incorporated herein by reference.

TECHNICAL FIELD

The present invention relates to a communication system and to parts and methods thereof. The invention has particular but not exclusive relevance to wireless communication systems and devices thereof operating according to the 3GPP (3rd Generation Partnership Project) standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, machine-type communication devices, and the like. In the following description the term user communication device is used, which is intended to cover any type of such user equipment (mobile and stationary).

In an active or connected state a user communication device is registered with the network and has a Radio Resource Control (RRC) connection with a base station so that the network knows to which base station (or cell thereof) the user communication device belongs and can transmit data to and receive data from the user communication device. Each user communication device also establishes a default Evolved Packet System (EPS) Bearer (i.e. an end-to-end dedicated communication path) from the user communication device to an endpoint beyond the base station, typically a gateway (such as a packet data network gateway—"PDN-GW" or "P-GW"—or the like), in the Enhanced Packet Core (EPC) network, or core network for short. An EPS Bearer, which is specific to the user communication device, defines a transmission path through the network and assigns an Internet Protocol (IP) address to the user communication device.

A Mobility Management Entity (MME) in the core network manages general mobility aspects of the user communication devices and ensures that connectivity is maintained with the user communication devices, for example as they are moving within the geographical area covered by the communication system (and/or as they are handed over between base stations of the communication system due to movement or changes in communication conditions). The MME also manages the various bearers associated with the user communication devices (such as an EPS bearer and/or the like) by controlling the other network nodes via which such bearers are provided. In order to do so, the MME exchanges Non-Access Stratum (NAS) signalling messages with the user communication devices (and/or the other network nodes) to manage the establishment of a communication session.

As part of the Long Term Evolution (LTE) of UTRAN (UMTS Terrestrial Radio Access Network) referred to as E-UTRAN, proximity-based services (ProSe) have been introduced, which make use of direct device-to-device (D2D) communication bearers directly between compatible user communication devices rather than indirect bearers provided from one user communication device, via a base station and the core network, to another user communication device (e.g. over a pair of EPS bearers). Thus, when a ProSe enabled user communication device is within the transmission range of (or served by the same base station as) another ProSe user communication device, they can communicate user data without the need to use core network resources. Such services can be achieved by establishing a special, "D2D", bearer between the user communication devices in direct communication (or communication routed via their base station only) instead of their default or other conventional EPS bearers (which might be still used for other types of communications). This direct or locally routed communication could result in better utilization of the available resources, especially on the radio interface, where these are limited. Details of the ProSe functionality have been specified in the 3GPP Technical Report TR 23.703 document, the contents of which are incorporated herein by reference.

More recently the provision of a relay functionality, in the user communication device, using the ProSe functionality has been proposed to allow one user communication device (referred to as a "UE-Relay" or "UE-R") to relay the signalling and the user data for another user communication device to and from the network, even if the other user communication device is not located within the network's coverage. In this case, the relayed user communication device can communicate with the network (both user plane and control plane data) via the UE-R thus accessing the same services as if the relayed user communication devices were served by a base station of the network.

In order to be able to benefit from ProSe services, a ProSe enabled user communication device performs a so-called discovery procedure (which can be done with or without network assistance/coverage). As part of this discovery procedure, each ProSe enabled user communication device transmits (e.g. periodically) a beacon for announcing itself to other such user communication devices in its proximity, and also listens for beacon transmissions by other devices. After two (or more) user communication devices have mutually discovered each other (e.g. they have received the other user communication device's beacon), they are able to start a ProSe communication session with each other.

The user communication device operating as a UE-R is able to relay traffic to one or more connected user communication devices via a (Relay) Packet Data Network (PDN) connection. In addition to this relay connection, the UE-R sends or receives (non-relayed) traffic for its own use (e.g. voice calls, Internet service, multimedia service, and/or the like).

In an exemplary scenario, a group of users (e.g. a team of Public Safety Officers at an emergency scene) may need to communicate with each other and/or with the network even when there is insufficient network coverage. In this case, one user can use his/her terminal as UE-Relay, while continuing to use it for his/her own needs as well. For example, the user of the UE-R may be using the following services: i) (group) voice services via an access point (gateway); and ii) video streaming from a remote server (e.g. an emergency scene monitoring server) via another (or the same) access point.

An access point typically comprises a gateway (e.g. a P-GW mentioned above) and can be identified by its associated Access Point Name (APN). In order to ensure that an appropriate level of service (e.g. a desired data rate) can be provided for each user in the communication network, the network operator assigns various parameters that determine an aggregate maximum bit rate (AMBR) that can be provided to the users (subscribers) in the network per subscriber and per access point. Specifically, for each subscriber, the Home Subscriber Server (HSS) holds an associated "HSS_APN-AMBR" parameter (per APN) and an "HSS_UE-AMBR" parameter, forming part of the user's subscription data.

The HSS_APN-AMBR (APN Aggregate Maximum Bit Rate) parameter for a particular (subscriber's) user communication device limits the non-guaranteed aggregate bit rate across all PDN connections by that user communication device via a particular APN. The actual "APN-AMBR" parameter to be used (enforced) by the given access point (e.g. P-GW) is provided by the MME based on subscription data obtained from the HSS.

The HSS_UE-AMBR (UE Aggregate Maximum Bit Rate) parameter for a particular (subscriber's) user communication device limits the total traffic of that user communication device on uplink and downlink (via the serving base station). The actual "UE-AMBR" parameter to be used (enforced) by the serving base station is provided by the MME based on subscription data obtained from the HSS. Specifically, the MME computes the UE-AMBR parameter such that it equals the smaller of the sum of all HSS_APN-AMBR parameters of active APNs and the HSS-UE-AMBR parameter. This is further illustrated in the 3GPP TS 23.401 standard, the contents of which are incorporated herein by reference. The MME transmits the calculated UE-AMBR parameter to the serving base station, which base station is thus able to allow/discard data traffic for the user communication device in accordance with the UE-AMBR parameter. This is further illustrated in the 3GPP TS 36.413 and TS 36.300 standards, the contents of which are incorporated herein by reference.

Thus traffic sent/received by a particular user communication device in excess of the bit rate indicated by the UE-AMBR parameter may get discarded by a rate shaping function of the base station serving that user communication device, and traffic exceeding the bit rate indicated by the applicable APN-AMBR parameter may get discarded by a rate shaping function of the corresponding APN. The UE-AMBR parameter and the APN-AMBR parameter are applicable across all non-Guaranteed Bit Rate (non-GBR) bearers of a particular subscriber (i.e. a user communication device associated with that subscriber).

SUMMARY OF INVENTION

Technical Problem

Since any user communication device behind the UE-R is not (necessarily) considered as being attached to the core network or as being in a connected state (although they are still able to communicate via the UE-R), any data communicated for such relayed user communication devices can only be sent/received whilst such data does not exceed the corresponding APN-AMBR and/or the UE-AMBR value for the UE-R. However, the values for the APN-AMBR and/or the UE-AMBR for the UE-R may be too small to support both relayed traffic and normal traffic destined to UE-R. Further, the UE-R may be configured to prioritise its own (non-relayed) traffic and de-prioritise any relayed traffic. Therefore, compared to regular (non-relayed) communication services, the user experience perceived by users of relayed user communication devices (and/or possibly by the user of the UE-R as well) may deteriorate whilst UE-R based relaying is used.

A possible solution would be for the network operator to increase the values of the APN-AMBR and the UE-AMBR parameters stored in the HSS for the UE-R to account for the additional data usage during relaying. However, such solution would have a significant drawback that, effectively, it would give additional privileges (e.g. higher effective data rates) to the user of the UE-R.

Further, the increase of the values of the APN-AMBR and the UE-AMBR parameters for the UE-R would not guarantee fair (even) data usage between the UE-R and connected (relayed) user communication devices. In fact, any increase in the aggregate maximum bit rate values for the UE-R may still not result in any increase in bit rate for relayed user communication devices connected to that UE-R. In addition, such relayed user communication devices are not necessarily perceived by the core network as being attached, and hence their associated aggregate maximum bit rate values (stored in the HSS) cannot be used by the network for relayed traffic.

Accordingly, preferred embodiments of the present invention aim to provide methods and apparatus which overcome or at least partially alleviate one or more of the above issues.

Solution to Problem

In one aspect, the invention provides a core network node comprising: means for generating: i) first configuration data identifying a first parameter for controlling data throughput for communications with a relaying user device when said relaying user device does not have a relaying connection with at least one other user communication device; and ii) second configuration data identifying a second parameter for controlling data throughput for communications with said relaying user device when said relaying user device does have a relaying connection with at least one other user communication device; and transceiver circuitry for communicating said first and second configuration data to another network node for managing communications with said relaying user device.

The first parameter might comprise a parameter for controlling a total data throughput for communications with said relaying user device when said relaying user device does not have a relaying connection with at least one other user communication device (e.g. a user equipment aggregated maximum bit rate "UE-AMBR" or an access point aggregated maximum bit rate "APN-AMBR"); and said second parameter might comprise an updated version of said first parameter for controlling a total data throughput for communications with said relaying user device when said relaying user device does have a relaying connection with at least one other user communication device (e.g. an updated version of the UE-AMBR or APN-AMBR).

The other network node might comprise a base station and/or an access point.

The generating means might be configured to generate said second parameter as the sum of: i) the smaller of: a total of all allowed non-relayed data throughputs for said relaying user device via each active access point serving said relaying user device; and a total allowed non-relayed data throughput for communications for said relaying user device; and ii) the smaller of: the total of all allowed relayed data throughputs for said relaying user device via each active access point serving said relaying user device; and the total allowed relayed data throughput for communications for said relaying user device. In this case, the generating means might be configured to generate said second parameter using the following equation:

$$UE\text{-}AMBR = Min[\Sigma(HSS\_APN\text{-}AMBR \text{ of all serving access points}), HSS\_UE\text{-}AMBR] + Min[\Sigma(HSS\_APN\text{-}Relay\text{-}AMBR \text{ of relaying access points}), HSS\_UE\text{-}Relay\text{-}AMBR]$$

wherein "UE-AMBR" is said second parameter; "HSS_APN-AMBR" is the allowed non-relayed data throughput for said relaying user device via a particular access point; "HSS_UE-AMBR" is the total allowed non-relayed data throughput for communications for said relaying user device; "HSS_APN-Relay-AMBR" is the allowed relayed data throughput for said relaying user device via a particular access point; "HSS_UE-Relay-AMBR" is the total allowed relayed data throughput for communications for said relaying user device.

Alternatively, the first parameter might comprise a parameter for controlling a total data throughput for communications with said relaying user device when said relaying user device does not have a relaying connection with at least one other user communication device (e.g. a user equipment aggregated maximum bit rate "UE-AMBR" or an access point aggregated maximum bit rate "APN-AMBR"); and the second parameter might comprise a dedicated parameter for controlling relayed data throughput, but not non-relayed data throughput, for communications with said relaying user device (e.g. a user equipment aggregated maximum bit rate for relaying "UE-Relay-AMBR" or "Extra-UE-AMBR" or an access point aggregated maximum bit rate for relaying "APN-Relay-AMBR" or "Extra-APN-AMBR").

The generating means might be configured to generate said second parameter by selecting the smaller of: the total of allowed relayed data throughputs for said relaying user device via each active access point serving said relaying user device; and the total allowed relayed data throughput for communications for said relaying user device. The generating means might be configured to generate said second parameter using the following equation:

$$UE\text{-}Relay\text{-}AMBR = Min[\Sigma(HSS\_APN\text{-}Relay\text{-}AMBR \text{ of all serving access points}), HSS\_UE\text{-}Relay\text{-}AMBR]$$

wherein "UE-Relay-AMBR" is said second parameter; "HSS_APN-Relay-AMBR" is the allowed relayed data throughput for said relaying user device via a particular access point; "HSS_UE-Relay-AMBR" is the total allowed relayed data throughput for communications for said relaying user device.

The generating means might be configured to generate said second parameter as the sum of: i) an allowed native data throughput for said relaying user device via said access point, wherein native data comprises data originated by or destined for said relaying user device; and ii) an allowed additional data throughput for said relaying user device via said access point. In this case, the generating means might be configured to generate said second parameter using the following equation:

$$APN\text{-}AMBR = HSS\_APN\text{-}AMBR + HSS\_Extra\text{-}APN\text{-}AMBR$$

wherein "APN-AMBR" is said second parameter; "HSS_APN-AMBR" is the allowed native data throughput for said relaying user device via said access point; "HSS_Extra-APN-AMBR" is the allowed additional data throughput for said relaying user device via said access point.

The transceiver circuitry might be operable to receive information identifying said allowed relayed data throughput for said relaying user device via a particular access point (HSS_APN-Relay-AMBR) and information identifying said total allowed relayed data throughput for communications for said relaying user device (HSS_UE-Relay-AMBR) from a home subscriber server (HSS). The transceiver circuitry might also be operable to receive information identifying said allowed additional data throughput for said relaying user device via said access point (HSS_Extra-APN-AMBR) from an HSS.

The second configuration data might identify a further parameter for controlling non-relayed ("native") data throughput, but not relayed ("non-native") data throughput, for communications with said relaying user device, when said relaying user device does have a relaying connection with at least one other user communication device (e.g. an updated version of said first parameter such as an updated version of the UE-AMBR or APN-AMBR).

Alternatively, the second configuration data might identify a further parameter for controlling both non-relayed ("native") data throughput and relayed ("non-native") data throughput for communications with said relaying user device, when said relaying user device does have a relaying connection with at least one other user communication device (e.g. an updated version of said first parameter such as an updated version of the UE-AMBR or APN-AMBR).

The core network node might further comprise means for determining the presence of a relaying connection via said relaying user device; and said transceiver circuitry might be operable to send, to said other network node: i) said first configuration data when said determining means determines that a relaying connection via said relaying user device is not present; and ii) said second configuration data when said determining means determines that a relaying connection via said relaying user device is present.

The core network node might comprise a mobility management entity (MME).

In one aspect, the invention provides a base station apparatus for facilitating communications between a core network and a relaying user device, the relaying user device being configured for relaying data for at least one other user device, the base station apparatus comprising: transceiver circuitry for communicating with said core network and with said relaying user device, wherein the transceiver circuitry is operable to receive, from said core network: i) first configuration data identifying a first parameter for controlling data throughput for communications with said relaying user device when said relaying user device does not have a relaying connection with at least one other user communication device; and ii) second configuration data identifying a second parameter for controlling data throughput for communications with said relaying user device when said relaying user device does have a relaying connection with at least one other user communication device; and a control module configured to manage communications with said relaying user device: based on said first parameter when said relaying user device does not have a relaying connection with at least one other user communication device; and based on said second parameter when said relaying user device does have a relaying connection with at least one other user communication device.

The control module might be configured to determine, on processing a data packet to be communicated for said relaying user device, whether said data packet comprises relayed data or non-relayed data; and said control module might be operable to manage communicating said data packet for said relaying user device based on said determination and said second and further parameters.

The transceiver circuitry might be operable to receive at least one of: relayed data packets including an information element set to indicate that said data packets are relayed; and non-relayed ("native") data packets including an information element set to indicate that said data packets are not relayed; and said control module might be configured to perform said determination of whether said data packet comprises relayed data or non-relayed data based on whether or not said data packet includes an information element set to indicate that said data packet is a relayed or a native data packet.

The transceiver circuitry might be operable to receive said at least one of relayed data packets and non-relayed ("native") data packets from the core network. In this case, the information element set to indicate that said data packets are relayed and/or said information element set to indicate that said data packets are not relayed might comprise an information element conforming to the General Packet Radio Service (GPRS) Tunnelling Protocol (GTP).

The transceiver circuitry might be operable to receive said at least one of relayed data packets and non-relayed ("native") data packets from the relaying user device when the relaying user device has a relaying connection with at least one other user communication device. The information element set to indicate that said data packets are relayed and/or said information element set to indicate that said data packets are not relayed might comprise an information element conforming to the Packet Data Convergence Protocol (PDCP) such as a field of a PDCP header. The information element set to indicate that said data packets are relayed and/or said information element set to indicate that said data packets are not relayed might comprise an information element conforming to the Media Access Control (MAC) protocol such as a MAC control element.

The transceiver circuitry might be operable to receive, from said relaying user device at least one of: a request for an allocation of communication resources for relayed data communication the request including an information element set to indicate that said request is for relayed data communication; and a request for an allocation of communication resources for non-relayed ("native") data communication the request including an information element set to indicate that said request is for non-relayed ("native") data communication; and said determination of whether said data packet comprises relayed data or non-relayed data might be based on whether said data packet is communicated using resources allocated for communicating relayed data, or allocated for communicating non-relayed ("native") data, responsive to said request(s) for an allocation of communication resources.

The control module might be operable to allocate resources responsive to said request(s) and to maintain, based on said information element(s) in said request(s), information identifying at least one of: communication resources allocated for relayed data communication; and communication resources allocated for non-relayed ("native") data communication.

The control module might be configured, on processing a data packet to be communicated for said relaying user device, to modify said data packets by including a further information element conforming to the GTP and set to indicate that said data packet is relayed and/or set to indicate that said data packets is not relayed, and said transceiver circuitry might be configured to forward said modified data packet to said core network.

The information element and/or said further information element might comprise at least one of: information identifying a GTP version number; a flag (e.g. a single bit of information) for indicating whether or not said data packets are relayed; information identifying a GTP message type (e.g. one or more message type values selected from a set including message type values 0, 8 to 15, 24, 25, 38 to 47, 61 to 69, 71 to 95, 106 to 111, 122 to 127, 130 to 239, and 242 to 253); information identifying the presence of a GTP extension header; and a GTP extension header.

The first parameter might comprise a first aggregate maximum bit rate (AMBR) parameter; and said second parameter might comprise a second AMBR parameter.

The base station might comprise a base station in accordance with the long term evolution (LTE) set of standards.

In one aspect, the invention provides an access point in a core network, the access point comprising: transceiver circuitry for communicating with a core network entity and with said relaying user device, wherein the transceiver circuitry is operable to receive, from said core network entity: i) first configuration data identifying a first parameter for controlling data throughput for communications with said relaying user device when said relaying user device does not have a relaying connection with at least one other user communication device; and ii) second configuration data identifying a second parameter for controlling data throughput for communications with said relaying user device when said relaying user device does have a relaying connection with at least one other user communication device; and a control module configured to manage communications with said relaying user device: based on said first parameter when said relaying user device does not have a relaying connection with at least one other user communication device; and based on said second parameter when said relaying user device does have a relaying connection with at least one other user communication device.

The control module might be configured to determine, on processing a data packet to be communicated for said relaying user device, whether said data packet comprises relayed data or non-relayed data; and said control module might be operable to manage communicating said data packet for said relaying user device based on said determination and said second and further parameters.

The control module might be operable to add to said data packet, upon forwarding said data packet towards said relaying user device: i) an information element set to indicate that said data packet is a relayed when said data packet is determined to comprise relayed data; and ii) an information element set to indicate that said data packet is a native data packet when said data packet is determined to comprise non-relayed data.

The access point might comprise a packet data network (PDN) gateway.

The second configuration data might be configured to identify at least one of: a second parameter for controlling a downlink data throughput for communications for said relaying user device when said relaying user device does not have a relaying connection with at least one other user communication device; and a second parameter for controlling an uplink data throughput for communications for said relaying user device when said relaying user device does not have a relaying connection with at least one other user communication device.

In one aspect, the invention provides a core network node comprising: means for holding parameters for controlling communications for a relaying user device, wherein said parameters comprise: i) a first parameter for controlling data throughput for communications for said relaying user device when said relaying user device does not have a relaying connection with at least one other user communication device (e.g. a user equipment aggregated maximum bit rate "HSS_UE-AMBR" parameter or an access point aggregated maximum bit rate "HSS_APN-AMBR" parameter); and ii) a second parameter for controlling data throughput for communications for said relaying user device when said relaying user device does have a relaying connection with at least one other user communication device (e.g. a user equipment aggregated maximum bit rate parameter for relaying "HSS_UE-Relay-AMBR" or "HSS_Extra-UE-AMBR" or an access point aggregated maximum bit rate parameter for relaying "HSS_APN-Relay-AMBR" or "HSS_Extra-APN-AMBR"); and transceiver circuitry for providing said information to a mobility management entity for controlling communications between said relaying user device and said core network.

The holding means might be configured to hold at least one of: a second parameter for controlling a downlink data throughput for communications for said relaying user device when said relaying user device does not have a relaying connection with at least one other user communication device; and a second parameter for controlling an uplink data throughput for communications for said relaying user device when said relaying user device does not have a relaying connection with at least one other user communication device.

The core network node might comprise a home subscriber server (HSS).

In one aspect, the invention provides a relaying user device comprising: transceiver circuitry for communicating with a base station and with at least one other user device, wherein the transceiver circuitry is operable: to receive data packets from the at least one other user device for relaying to the base station; and to transmit said received data packets, as relayed data packets, towards said base station; and means for including in said relayed data packets information identifying that said relayed data packets are relayed data packets.

The including means might be operable to include said information identifying that said relayed data packets are relayed data packets in a field (e.g. a header) of Packet Data Convergence Protocol (PDCP) signalling. The including means might be operable to include said information identifying that said relayed data packets are relayed data packets in a field (e.g. a control element) of Media Access Control (MAC) signalling.

The relaying user device might comprise user equipment (UE) in accordance with the long term evolution (LTE) set of standards.

In one aspect, the invention provides an access point in a core network, the access point comprising: transceiver circuitry for communicating with a relaying user device, wherein the transceiver circuitry is operable to receive data packets for transmitting said data packets towards another user device connected to said relaying user device; and means for including in said transmitted data packets information identifying that said transmitted data packets are relayed data packets.

In one aspect, the invention provides an access point in a core network, the access point comprising: transceiver circuitry for communicating with a relaying user device, wherein the transceiver circuitry is operable to receive data packets from said relaying user device; and a control module configured to determine, upon processing a data packet of said received data packets, whether said data packet is a relayed data packet; and wherein said control module is configured to manage communications for said relaying user device based on said determination.

The transceiver circuitry might be operable to obtain configuration data identifying a parameter for controlling data throughput for communications with said relaying user device when said relaying user device has a relaying connection with another user communication device; and said control module might be configured to manage communications for said relaying user device based on said parameter when said data packet is determined to be a relayed data packet.

The information identifying said data packet is relayed data packet might comprise an information element conforming to the General Packet Radio Service (GPRS) Tunnelling Protocol (GTP). In this case, the information element might comprise at least one of: information identifying a GTP version number; a flag (e.g. a single bit of information) for indicating whether or not said data packets are relayed; information identifying a GTP message type (e.g. one or more message type values selected from a set including message type values 0, 8 to 15, 24, 25, 38 to 47, 61 to 69, 71 to 95, 106 to 111, 122 to 127, 130 to 239, and 242 to 253); information identifying the presence of a GTP extension header; and a GTP extension header.

The access point might comprise a packet data network gateway (P-GW).

The invention also provides a system comprising the above described core network nodes, the above described base station apparatus; the above described access point; and a relaying user device.

Aspects of the invention extend to corresponding methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

FIG. 10A illustrates an exemplary rate enforcement scenario in accordance with FIG. 7.

FIG. 10B illustrates an exemplary rate enforcement scenario in accordance with FIG. 9.

DESCRIPTION OF EMBODIMENTS

Embodiments of the invention will now be described, by way of example, with reference to the accompanying drawings.

<Overview>

Figure 1:
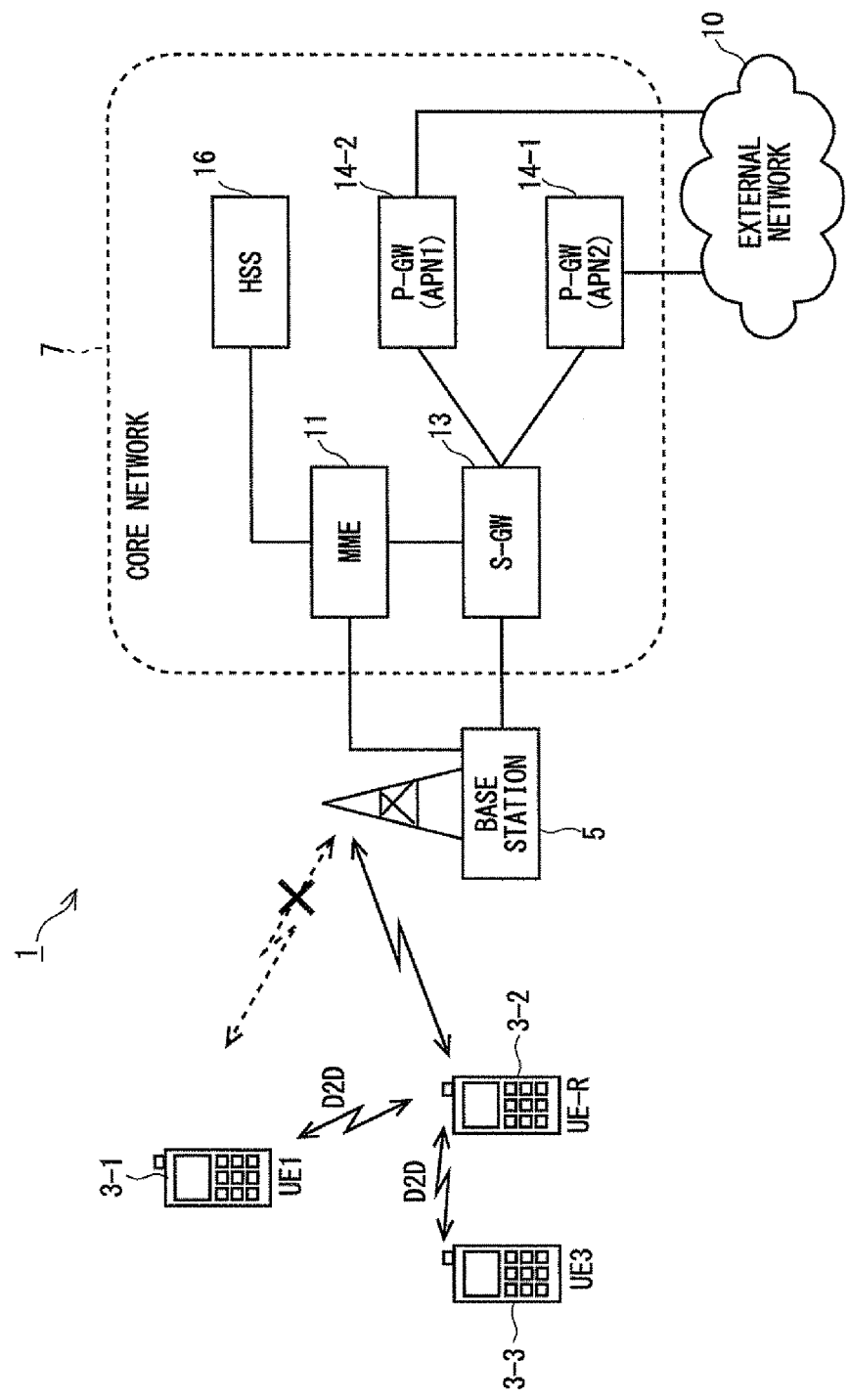
FIG. 1 illustrates schematically a cellular communication system to which embodiments of the invention may be applied.

FIG. 1 schematically illustrates a communication network (system) 1 in which users of user equipment (in this example user communication devices) 3-1 to 3-3 can communicate with each other and other users via an E-UTRAN base station 5 and a core network 7. As those skilled in the art will appreciate, three user communication devices 3 and one base station 5 are shown in FIG. 1 for illustration purposes, additional user equipment and/or base stations may be present in a deployed system.

The base station 5 is coupled to a core network 7 and the core network 7 is also coupled to other networks 10 (e.g. the Internet) via one or more gateways. The interface between the base station 5 and elements of the core network 7 might utilise, for example, a high speed, high bandwidth communication link, such as an optical fiber link and the like. The core network 7 includes, amongst other things, a mobility management entity (MME) 11, a serving gateway (S-GW) 13, Packet Data Network (PDN) Gateways (P-GWs) 14-1 and 14-2, and a Home Subscriber Server (HSS) 16.

The MME 11 manages general mobility aspects of the user communication devices 3 and ensures that connectivity is maintained with the user communication devices 3 as they are moving within the geographical area covered by the communication system (and/or as they are handed over between base stations of the communication system). The MME 11 also manages the various bearers associated with the user communication devices 3 (e.g. such as an EPS bearer and/or a Multimedia Broadcast/Multicast Service (MBMS) bearer) by controlling the other network nodes via which such bearers are provided. The MME 11 is also responsible for ensuring that the users of each user communication device 3 receive an appropriate level of service (e.g. a desired bit rate) in accordance with their respective subscription. In particular, the MME 11 is responsible for calculating the associated AMBR values (based on information obtained from the HSS 16) for each user communication device 3 served by the MME 11.

The S-GW 13 connects the base station 5 (and hence the user communication devices 3) to the core network 7 for communicating user data using one or more associated bearer (such as an EPS bearer). The bearer carrying user data (for a corresponding user communication device 3) normally terminates at the P-GW 14 (i.e. the access point for that bearer), although it is often complemented by an external bearer as well between the P-GW 14 and a communication end-point outside the core network 7. It will be appreciated that, whilst shown as separate entities, the functionalities of the S-GW 13 and the P-GW 14 could be implemented in a single gateway element.

The HSS 16 maintains subscription specific information (e.g. subscribed services, associated service parameters, device capabilities, and/or the like) for each user communication device 3. The HSS 16 provides such stored information to other network nodes (e.g. the MME 11) as needed. For example, the MME 11 can obtain subscription information (e.g. information based on which an associated AMBR can be derived) from the HSS 16 during the phase when a user communication device 3 initially attaches to the communication network 1 (e.g. registers itself with the MME 11).

The user communication devices 3 shown in FIG. 1 are each equipped with ProSe functionality, thus they can establish direct communication (denoted "D2D" in FIG. 1) with each other (assuming they are within each other's vicinity and they have performed appropriate discovery and connection procedures).

In this example, the first user communication device 3-1 (denoted "UE1") and the third user communication device 3-3 (denoted "UE3") are outside the coverage of the base station 5 and the second user communication device 3-2 (denoted "UE-R") is within the coverage of the base station 5 (as indicated by the arrow between the user communication device 3-2 and the base station 5). The UE-R 3-2 is attached the core network 7 (via the base station 5), e.g. after having performed an appropriate network attachment procedure. Thus, the first and third user communication devices 3-1 and 3-3 can also access and be served by the core network 7 via the UE-R 3-2, using the UE-R's 3-2 connection (e.g. EPS bearer) with the core network 7.

Once the first and third user communication devices 3-1 and 3-3 are connected to the UE-R 3-2), they can send and receive data to the core network 7 via the UE-R 3-2. It is noted that the UE-R 3-2 may have a number of EPS bearers with the network (e.g. up to a maximum of 11 concurrent EPS bearers in LTE), but the network may not necessarily be able to determine whether an EPS bearer used by the UE-R 3-2 only or it is used by one or more relayed user communication devices 3-1 and 3-3 as well.

In this embodiment, the HSS 16 holds "relay-specific" AMBR parameters allowing the network operator to control the maximum allowed bandwidth whilst the user communication device is relaying data (for other user communication devices), e.g. in addition to parameters controlling the maximum allowed bandwidth for the relaying user communication device's own (non-relayed) data. The relay-specific AMBR parameters may be provided per subscriber and/or per access point.

Specifically, the HSS 16 holds (and provides to the MME 11), in this example: an "HSS_APN-Relay-AMBR" parameter determining an APN-specific (i.e. for a particular P-GW 14) aggregate maximum bit rate allowed for relayed communications via the UE-R 3-2 (downlink and uplink); and a "HSS_UE-Relay-AMBR" parameter determining an aggregate maximum bit rate allowed for relayed communications via the UE-R 3-2 (across all access points and all relayed user communication devices).

When a relaying capable user communication device (in this embodiment, UE-R 3-2), initially establishes a connection with the core network 7, the MME 11 obtains the subscription data associated with that user communication device 3-2 from the HSS 16. Using the subscription parameters (including the relay-specific AMBR parameters) for the UE-R 3-2, the MME 11 determines the applicable maximum authorized UE-AMBR parameter and any APN-AMBR parameters for the UE-R 3-2. When no other user communication device has a relaying connection with the UE-R, the UE-AMBR and APN-AMBR parameters are determined, by the MME 11 as normal. However, when one or more other user communication devices begins to establish a relaying connection via the UE-R the MME 11 re-determines the UE-AMBR and APN-AMBR parameters, based on the relay specific parameters stored in the HSS 16, and provides them to the base station 5/P-GW 14 as appropriate.

Specifically, when one or more other user communication devices begins to establish a relaying connection via the UE-R, the MME 11 determines, for each APN that the UE-R 3-2 is authorised to use, a respective relaying specific APN-AMBR parameter ("APN-Relay-AMBR") which represents the maximum allowed relayed traffic using a combination of that APN and that UE-R 3-2 (on uplink and downlink) whilst relaying takes place. The format of this parameter is similar to that of the normal non-relaying APN-AMBR parameter. In this embodiment, the MME 11 determines each APN-Relay-AMBR parameter to be equal to the corresponding HSS_APN-Relay-AMBR parameter obtained from the HSS 16. It is noted that a different respective HSS_APN-Relay-AMBR parameter and hence a different respective APN-Relay-AMBR parameter may be associated with each access point (P-GW 14-1, 14-2) authorised for use by the UE-R 3-2. The respective APN-Relay-AMBR parameter is provided to each associated P-GW 14 during establishment of the corresponding relaying PDN connection with that P-GW 14. Thus, the P-GW 14 can beneficially apply a two-level AMBR for traffic via the UE-R 3-2 by enforcing the APN-AMBR for the "normal" (or "native") non-relayed traffic and the APN-Relay-AMBR for relayed traffic.

The MME 11 also re-calculates a new relaying specific value for the UE-AMBR parameter for the UE-R 3-2, which represents the maximum total allowed relayed traffic via the UE-R 3-2 (irrespective of which APN is used, i.e. across all APNs). The MME 11 calculates the new relaying specific value for the UE-AMBR parameter using the following equation.

$$UE\text{-}AMBR = Min[\Sigma(HSS\_APN\text{-}AMBR \text{ of active APNs}), HSS\_UE\text{-}AMBR] + Min[\Sigma(HSS\_APN\text{-}Relay\text{-}AMBR \text{ of relaying APNs}), HSS\_UE\text{-}Relay\text{-}AMBR]$$

In other words, the UE-AMBR parameter is set to be the sum of: i) the smaller of the sum of all HSS_APN-AMBR parameters of active APNs and the HSS-UE-AMBR parameter; and ii) the smaller of the sum of all HSS_APN-Relay-AMBR parameters of relaying APNs and the HSS-UE-Relay-AMBR parameter. Thus, rather than simply accounting for the UE-R's 3-2 own (non-relayed) traffic, the MME 11 is able to anticipate the need for additional bit rate values at the authorised APNs to support relaying data via the UE-R 3-2.

The MME 11 provides the new value of the UE-AMBR parameter to the base station 5 serving the UE-R 3-2.

Advantageously, therefore, during relaying the P-GW 14-1 and the P-GW 14-2 only discard traffic which is in excess of the bit rate indicated by their own applicable APN-Relay-AMBR parameter for the UE-R 3-2. Similarly, the base station 5 serving the UE-R 3-2 only discards traffic which is in excess of the bit rate indicated by the new relay specific value of UE-AMBR for that UE-R 3-2.

Thus, whenever there is data being communicated for the UE-R 3-2 and/or for any relayed user communication device 3-1 or 3-3, the communication network 1 is able to alleviate potential communication problems, for the users of each user communication device 3-1 to 3-3, arising from data packets being discarded due to inappropriate (e.g. too low) bit rate associated with the UE-R 3-2.

This approach also results in a better traffic distribution (fair use) between the UE-R 3-2 and any relayed user communication device 3-1, 3-3 connected to the UE-R 3-2 (but which are not themselves necessarily attached to the network). Further, it is also possible to prevent the user communication device 3-2 from overusing its bit rate allocations whilst operating as a UE-Relay.

Beneficially, there is no need to increase the value of the HSS_UE-AMBR and/or HSS_APN-AMBR parameters (in the HSS 16) associated with the subscriber operating the user communication device 3-2.

It is noted that, in the above embodiment, the UE-AMBR parameter is re-used with a new value (e.g. as opposed to using a dedicated UE-Relay-AMBR parameter). This can beneficial as it allows the signalling between the MME 11 and base station 5 to remain essentially unchanged. It will be appreciated, however, that a dedicated UE-Relay-AMBR parameter may be used instead of, or in addition, to reusing the UE-AMBR parameter, and a particularly advantageous embodiment will be described in which this is the case.

<User Communication Device>

Figure 2:
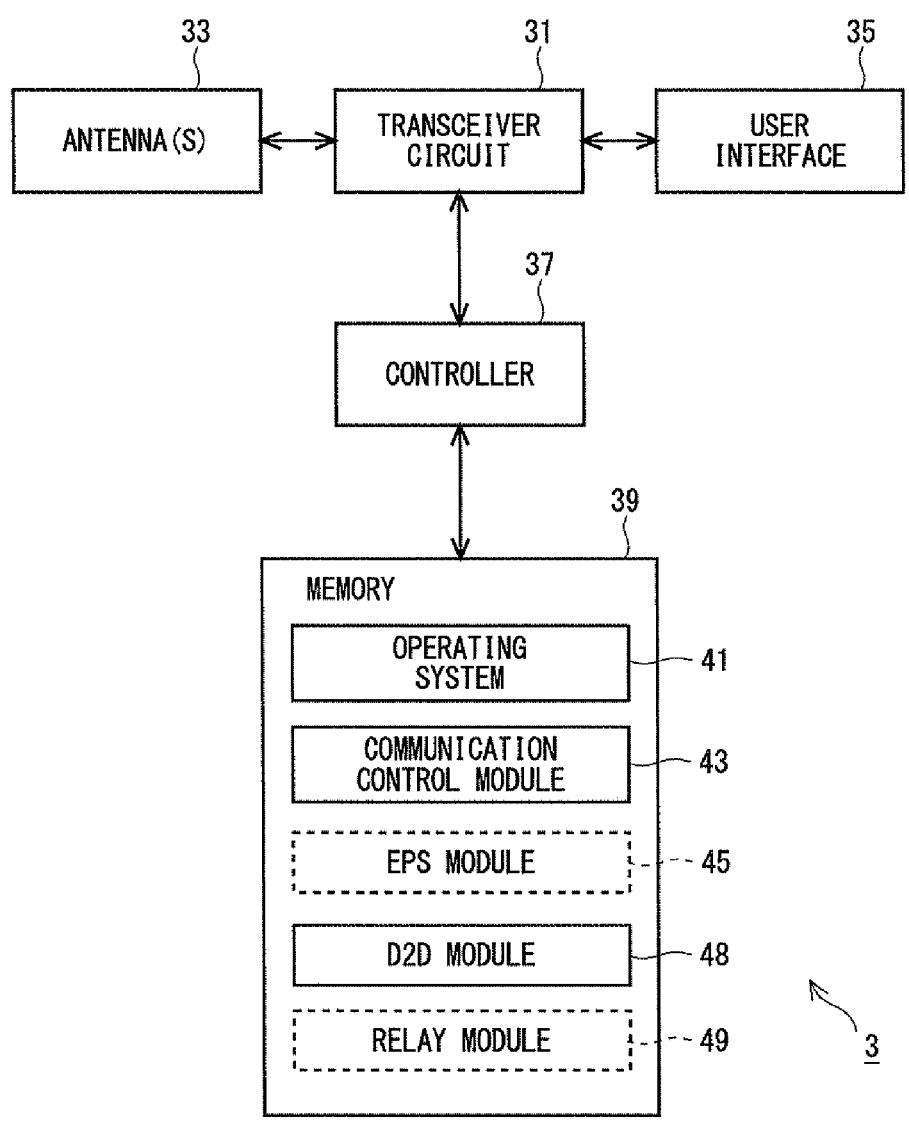
FIG. 2 is a functional block diagram illustrating some of the functionality of a user communication device forming part of the system shown in FIG. 1.

FIG. 2 is a functional block diagram illustrating some of the functionality of a user communication device 3 shown in FIG. 1. As shown in FIG. 2, the user communication device 3 has a transceiver circuit 31 that is operable to transmit signals to and to receive signals from a base station 5 and/or other user communication devices 3 via one or more antenna 33. The user communication device 3 has a controller 37 to control the operation of the user communication device 3. The controller 37 is associated with a memory 39 and is coupled to the transceiver circuit 31. Although not necessarily shown in FIG. 2, the user communication device 3 will of course have all the usual functionality of a conventional user communication device (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the user communication device 3 by, in this example, program instructions or software instructions stored within the memory 39. As shown in FIG. 2, these software instructions include, among other things, an operating system 41, a communication control module 43, an EPS module 45, and a device-to-device (D2D) module 48. When the user communication device (e.g. the UE-R 3-2 shown in FIG. 1) is configured for relaying data for other communication devices 3, the UE-R 3-2 also includes a relay module 49.

The communication control module 43 handles (e.g. generates, sends and receives) control signals for controlling the connections between the user communication device 3 and other user communication devices, the base station 5, or the core network entities. The communication control module 43 also controls the separate flows of uplink/downlink data and signalling that are to be transmitted to/from the other user communication devices 3, to/from the base station 5, other user communication devices, and the core network entities using associated TFTs.

The EPS module 45 (which is optional when the user communication device 3 is being relayed via a UE-R) is operable to instruct the communication control module 43 to set up a communication path (EPS bearer) with the network. Each EPS bearer is associated with an EPS bearer ID, and at least one EPS TFT. When the user communication device 3 operates as a UE-R, the EPS module 45 maintains information on any EPS bearer for connected (relayed) user communication device(s), e.g. in addition to maintaining information on the UE-R's own EPS bearer(s).

The device-to-device module 48 is operable to instruct the communication control module 43 to set up a device-to-device communication path (e.g. a ProSe based relayed communication path) to other compatible user equipment in the vicinity of the user communication device 3. Each device-to-device communication path is associated with a D2D bearer ID, and at least one D2D TFT.

The relaying module 49 relays data for other user communication devices connected to the user communication device 3 whilst it is operating as a UE-R. The relaying module 49 may, for example, maintain a mapping between EPS bearer IDs (provided by the EPS module 45) and D2D bearer ID(s) (provided by the device-to-device module 48) for relaying data between such mapped bearers. The relaying module 49 receives data flows (e.g. IP packets associated with an appropriate EPS/D2D bearer ID) and forwards (relays) the received data based on the bearer mapping. The relaying module 49 may also receive data flows (e.g. IP packets associated with an appropriate EPS/D2D bearer ID) and forward (relay) the received data based on the associated TFT information to the appropriate D2D bearer (provided by the device-to-device module 48).

Although not shown in FIG. 2, the relaying module 49 also includes a PDCP module and a MAC module for managing (i.e. generating, sending, receiving) communications in accordance with the PDCP and MAC protocols, respectively. In some embodiments, the PDCP module and/or the MAC module is configured to add (e.g. to an appropriately formatted field) an indication of the type of traffic (e.g. native/relayed) associated with a data packet, before communicating that data packet to the base station 5 (via the transceiver circuit 31).

<Base Station>

Figure 3:
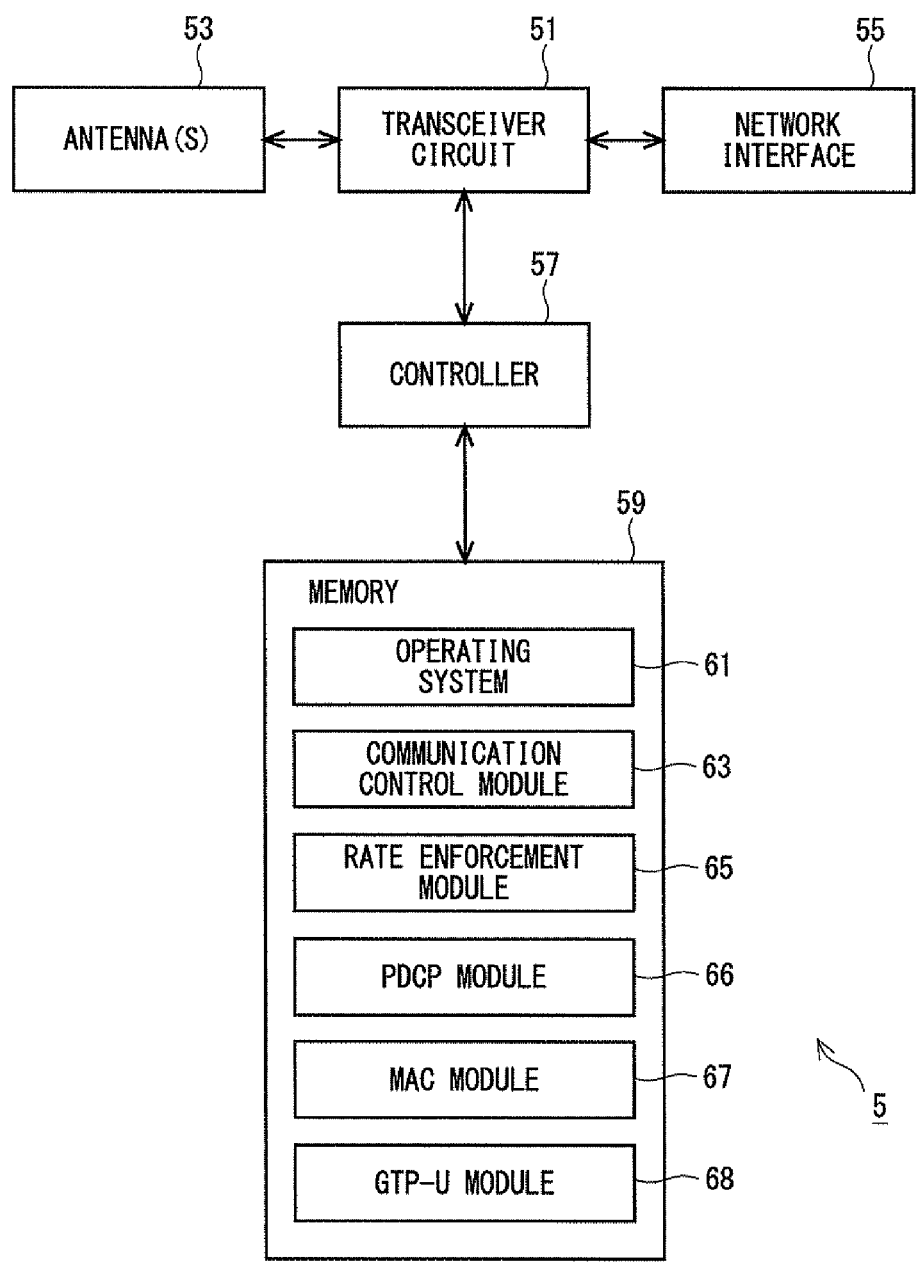
FIG. 3 is a functional block diagram illustrating some of the functionality of a base station forming part of the system shown in FIG. 1.

FIG. 3 is a functional block diagram illustrating some of the functionality of the base station 5 shown in FIG. 1. As shown in FIG. 3, the base station 5 has a transceiver circuit 51 that is operable to transmit signals to and to receive signals from user communication devices 3 via one or more antenna 53. The base station 5 has a controller 57 to control the operation of the base station 5. The controller 57 is associated with a memory 59 and is coupled to the transceiver circuit 51. Software may be pre-installed in the memory 59 and/or may be downloaded via the communication network or from a removable data storage device (RMD), for example.

The controller 57 is configured to control overall operation of the base station 5 by, in this example, program instructions or software instructions stored within the memory 59. As shown in FIG. 3, these software instructions include, among other things, an operating system 61, a communication control module 63, a rate enforcement module 65, a PDCP module 66, a MAC module 67, and a GTP-U module 68.

The communication control module 63 handles (e.g. generates, sends and receives) control signals for controlling the connections between the base station 5 and user communication devices 3 or the core network entities. The communication control module 63 also controls the separate flows of uplink/downlink data and signalling that are to be transmitted from/to the user communication devices 3 and/or the core network entities.

The rate enforcement module 65 performs rate enforcement for user communication devices 3 served by the base station 5. Specifically, the rate enforcement module 65 is responsible for allowing traffic (e.g. data packets) to be transmitted to/from the UE-R 3-2 up to the bit rate indicated by the UE-AMBR (or UE-Relay-AMBR, if appropriate) for the UE-R 3-2. However, the rate enforcement module 65 discards any data packet which is sent/received in excess of the bit rate indicated by the UE-AMBR (or UE-Relay-AMBR) for the UE-R 3-2. Further, the rate enforcement module 65 is responsible for distinguishing between the different types of traffic communicated via the base station 5 (e.g. between the UE-R's 3-2 native and relayed traffic), using assistance provided by the other modules (e.g. the PDCP module 66, the MAC module 67, and the GTP-U module 68) as appropriate.

The PDCP module 66 is responsible for managing (i.e. generating, sending, receiving) communications in accordance with the PDCP protocol. In some embodiments, the PDCP module 66 is configured to determine the presence of an indication (e.g. an appropriately formatted header field) of the type of traffic (e.g. native/relayed) and to provide, to the rate enforcement module 65, information identifying the type of traffic.

The MAC module 67 is responsible for managing (i.e. generating, sending, receiving) communications in accordance with the MAC protocol. In some embodiments, the MAC module 67 is configured to determine the presence of an indication (e.g. an appropriately formatted control element) of the type of traffic (e.g. native/relayed) and to provide, to the rate enforcement module 65, information identifying the type of traffic.

The GTP-U module 68 is responsible for managing (i.e. generating, sending, receiving) communications in accordance with the GTP protocol. In some embodiments, the GTP-U module 68 is configured to determine the presence of an indication (e.g. in an appropriately formatted field of the GTP header/payload) of the type of traffic (e.g. native/relayed) and to provide, to the rate enforcement module 65, information identifying the type of traffic. In some embodiments, the GTP-U module 68 is configured to add (e.g. to an appropriately formatted field of the GTP header/payload) an indication of the type of traffic (e.g. native/relayed) associated with a data packet, before communicating that data packet to other nodes (via the transceiver circuit 51).

<Mobility Management Entity>

Figure 4:
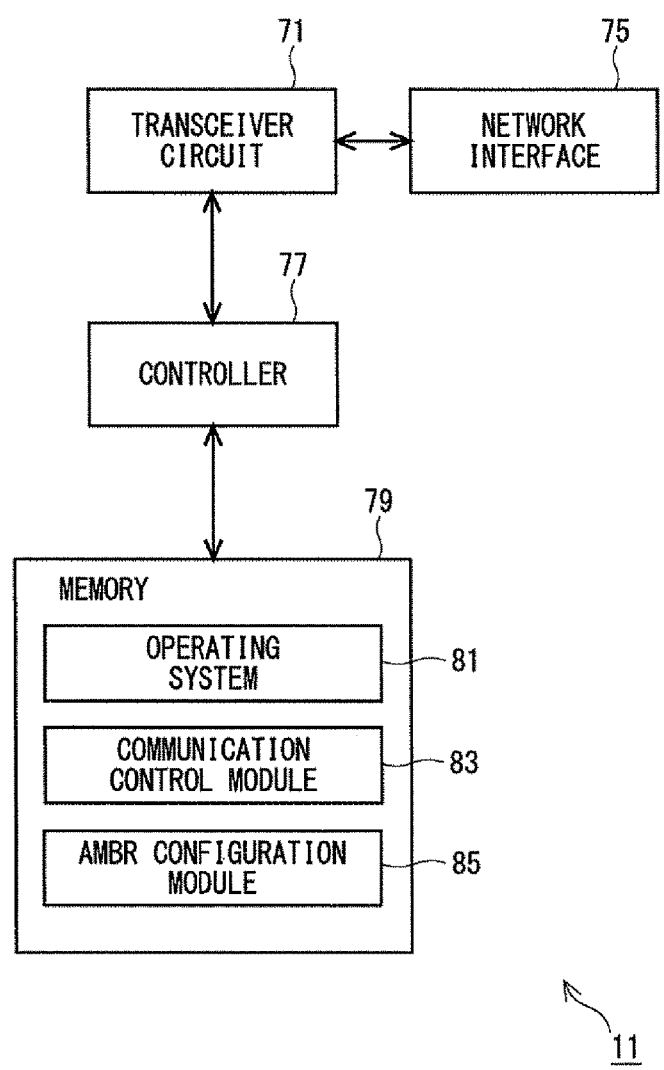
FIG. 4 is a functional block diagram illustrating some of the functionality of a Mobility Management Entity (MME) forming part of the system shown in FIG. 1.

FIG. 4 is a functional block diagram illustrating some of the functionality of a Mobility Management Entity 11 forming part of the system 1 shown in FIG. 1. As shown in FIG. 4, the MME 11 has a transceiver circuit 71 that is operable to transmit signals to and to receive signals from other communication nodes (such as the base station 5, the gateways 13/14, the HSS 16, and/or the user communication devices 3) via a network interface 75. The MME 11 has a controller 77 to control the operation of the MME 11. The controller 77 is associated with a memory 79 and is coupled to the transceiver circuit 71. Software may be pre-installed in the memory 79 and/or may be downloaded via the communication network or from a removable data storage device (RMD), for example.

The controller 77 is configured to control overall operation of the MME 11 by, in this example, program instructions or software instructions stored within the memory 79. As shown in FIG. 4, these software instructions include, among other things, an operating system 81, a communication control module 83, and an AMBR configuration module 85.

The communication control module 83 handles (e.g. generates, sends and receives) control signals for controlling the connections between the MME 11 and other communication nodes (e.g. the user communication devices 3, the base station 5, the gateways 13/14, and the HSS 16).

The AMBR configuration module 85 assists the configuration of the base station 5 and the PDN gateways 14-1 and/or 14-2, serving the user communication device 3-2 acting as a UE-R, for forwarding data between the network and the UE-R 3-2 (and/or any user communication device connected to it) in accordance with a data bit rate allowed by the subscription of the user of the UE-R 3-2. In order to do so, the AMBR configuration module 85 obtains subscription data from the HSS 16, and calculates (based on the obtained subscription data) one or more appropriate AMBR value(s) for the UE-R 3-2, e.g. values associated with each access point (such as gateways 14-1 and 14-2) that the UE-R 3-2 is authorised to use. The AMBR configuration module 85 provides the appropriate calculated bit rate value(s) to the base station 5 and P-GW 14 serving the UE-R 3-2, for performing rate enforcement on the data packets communicated for the UE-R 3-2 (and/or any user communication device connected to it).

<Gateway Entity>

Figure 5:
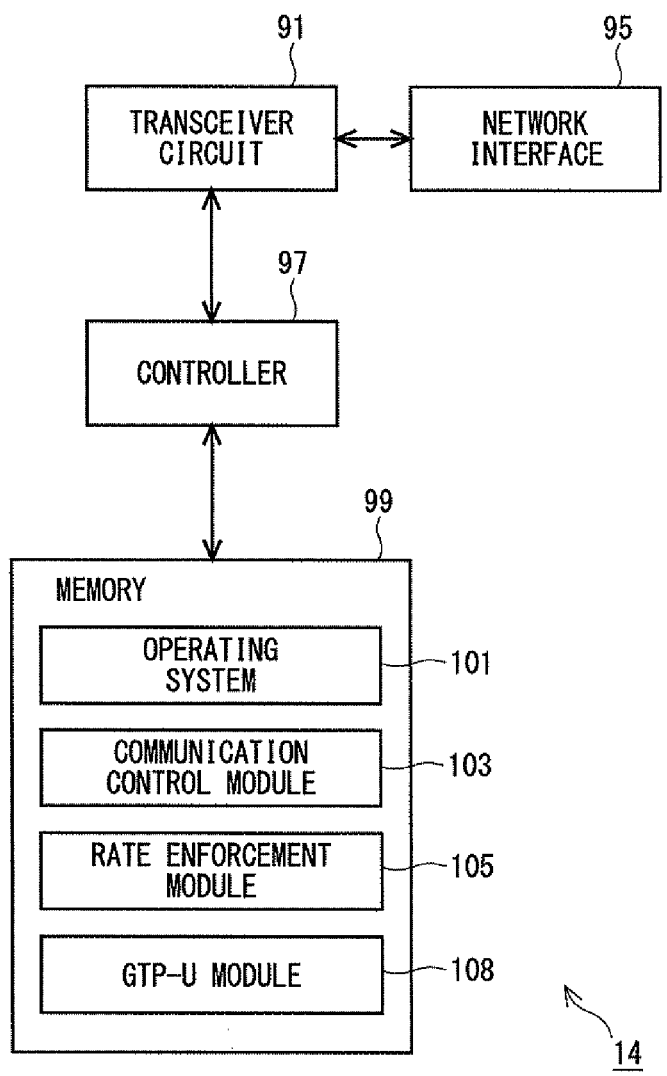
FIG. 5 is a functional block diagram illustrating some of the functionality of a PDN gateway (P-GW) forming part of the system shown in FIG. 1.

FIG. 5 is a functional block diagram illustrating some of the functionality of a PDN gateway 14 (such as the P-GW 14-1 and 14-2) forming part of the system 1 shown in FIG. 1. As shown in FIG. 5, the P-GW 14 has a transceiver circuit 91 that is operable to transmit signals to and to receive signals from a base station 5 and/or the user communication devices 3 via a network interface 95. The P-GW 14 has a controller 97 to control the operation of the P-GW 14. The controller 97 is associated with a memory 99 and is coupled to the transceiver circuit 91. Software may be pre-installed in the memory 99 and/or may be downloaded via the communication network or from a removable data storage device (RMD), for example.

The controller 97 is configured to control overall operation of the P-GW 14 by, in this example, program instructions or software instructions stored within the memory 99. As shown in FIG. 5, these software instructions include, among other things, an operating system 101, a communication control module 103, a rate enforcement module 105, and a GTP-U module 108.

The communication control module 103 handles (e.g. generates, sends and receives) control signals for controlling the connections between the P-GW 14 and other communication nodes (e.g. the user communication devices 3, the base station 5, and the MME 11).

The rate enforcement module 105 performs rate enforcement for user communication devices 3 served by the P-GW 14. Specifically, the rate enforcement module 105 is responsible for allowing traffic (e.g. data packets) to be transmitted to/from the UE-R 3-2 up to the bit rate indicated by the APN-AMBR (or APN-Relay-AMBR, if appropriate) for the UE-R 3-2. However, the rate enforcement module 105 discards any data packet which is sent/received in excess of the bit rate indicated by the APN-AMBR (or APN-Relay-AMBR) for the UE-R 3-2. Further, the rate enforcement module 105 is responsible for distinguishing between the different types of traffic communicated via the P-GW 14 (e.g. between the UE-R's 3-2 native and relayed traffic), using assistance provided by the GTP-U module 108 as appropriate.

The GTP-U module 108 is responsible for managing (i.e. generating, sending, receiving) communications in accordance with the GTP protocol. In some embodiments, the GTP-U module 108 is configured to determine the presence of an indication (e.g. in an appropriately formatted field of the GTP header/payload) of the type of traffic (e.g. native/relayed) and to provide, to the rate enforcement module 105, information identifying the type of traffic. In some embodiments, the GTP-U module 108 is configured to add (e.g. to an appropriately formatted field of the GTP header/payload) an indication of the type of traffic (e.g. native/relayed) associated with a data packet, before communicating that data packet to other nodes (via the transceiver circuit 91).

In the above description, the user communication device 3, the base station 5, the mobility management entity 11, and the P-GW 14 are described for ease of understanding as having a number of discrete modules (such as the communications control modules, the relay module, the AMBR configuration module, and the rate enforcement modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

Figure 6:
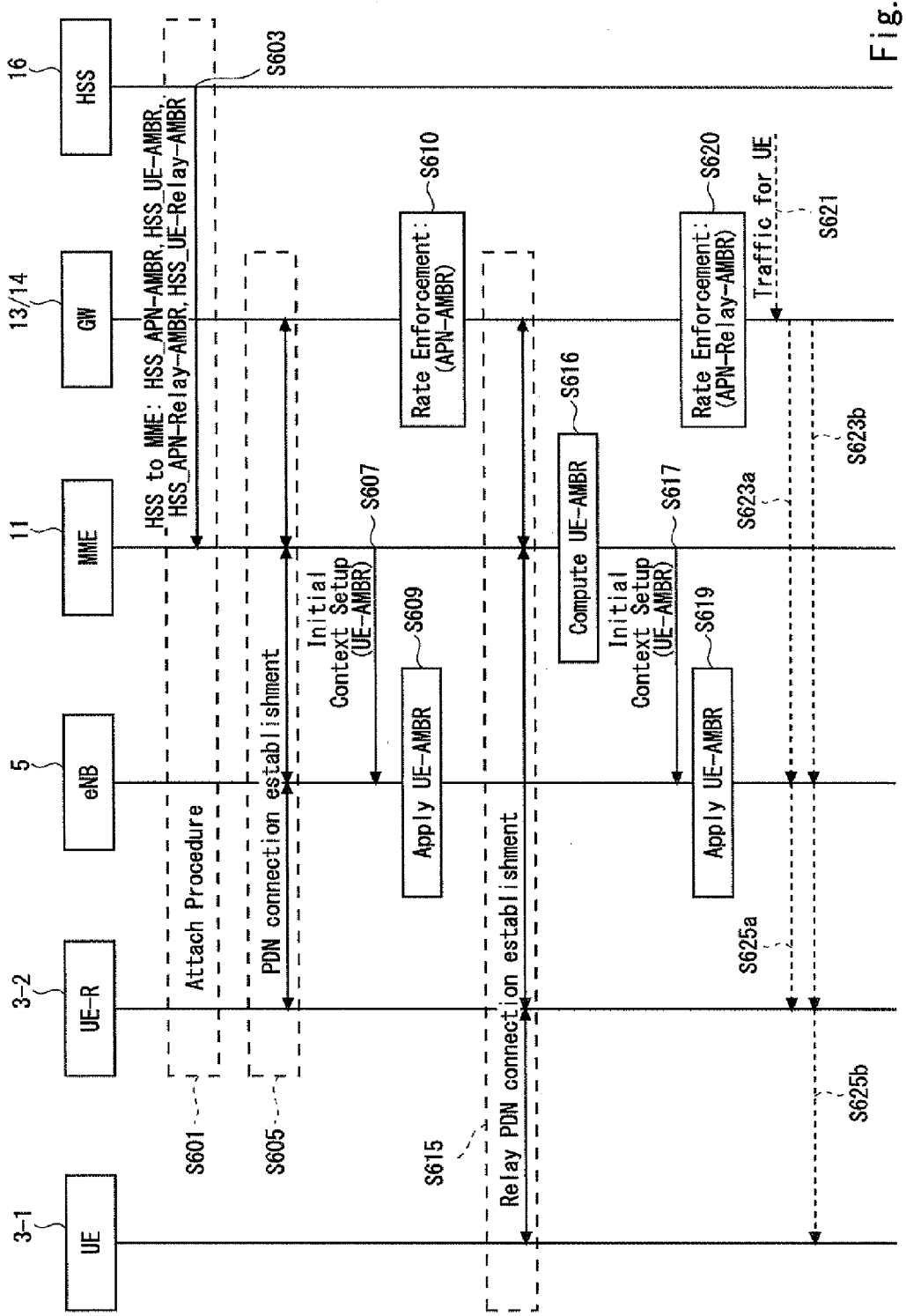
FIG. 6 is a timing diagram illustrating an exemplary way in which rate enforcement may be realised in the system shown in FIG. 1.

FIG. 6 is a timing diagram illustrating an exemplary way in which rate enforcement may be realised in the system 1 shown in FIG. 1. In this example, packet forwarding is controlled using an AMBR value that defines the maximum total traffic allowed for relaying, across all APNs.

Initially, the second user communication device 3-2 is set up as a UE-R (although there may not be any user equipment connected to it yet) and the user communication device 3-2 is within the coverage of the network (base station 5).

In step S601, the user communication device 3-2 performs (using its communication control module 43) a network attachment procedure (e.g. by registering with the MME 11 serving the UE-R 3-2). As part of this procedure, the MME 11 obtains, from the HSS 16 in step S603, subscription parameters associated with the user communication device 3-2, such as:

an "HSS_APN-AMBR" parameter determining a gateway specific aggregate maximum bit rate allowed for the UE-R's 3-2 own (non-relayed) communications via the particular P-GW 14 (access point) serving the UE-R 3-2;

an "HSS_UE-AMBR" parameter determining an aggregate maximum bit rate allowed for all (non-relayed) communications for the UE-R 3-2 (regardless of which access point is used);

an "HSS_APN-Relay-AMBR" parameter determining an APN-specific (i.e. for a particular P-GW 14) aggregate maximum bit rate allowed for relayed communications via the UE-R 3-2 (downlink and uplink); and an "HSS_UE-Relay-AMBR" parameter determining an aggregate maximum bit rate allowed for relayed communications via the UE-R 3-2 (across all access points and all relayed user communication devices).

Following the receipt of the UE-R's 3-2 subscription parameters, the MME 11 calculates (using its AMBR configuration module 85) the UE-AMBR parameter for the base station 5 and the respective APN-AMBR parameters for each P-GW(s) 14-1, 14-2 that the UE-R 3-2 is authorised to use. For example, the MME 11 may calculate these parameters as specified in the 3GPP TS 23.401 standard.

Next, as generally shown in step S605, the UE-R 3-2 performs (using its EPS module 45) a PDN connection establishment procedure with the network (e.g. with the base station 5, the MME 11, and the P-GW 14 serving the UE-R 3-2).

Following the PDN connection establishment, the MME 11 generates (using its communication control module 83) and sends, at step S607, an appropriately formatted signalling message (e.g. an "Initial Context Setup" message) to the base station 5 for registering the successful PDN connection establishment for the UE-R 3-2 (via the base station 5). The MME 11 includes in this message the UE-AMBR parameter it calculated earlier, to be applied by the base station 5 for the UE-R's 3-2 communications.

Upon receipt of the MME's 11 message, as shown in step S609, the base station 5 (e.g. using its rate enforcement module 65) is ready to apply the UE-AMBR parameter for the UE-R's 3-2 communications with the network (both uplink and downlink).

Although not shown in FIG. 6, the MME 11 also provides (e.g. during PDN connection establishment) the respective APN-AMBR parameters to each P-GW 14-1, 14-2 serving the UE-R 3-2. Thus, as shown in step S610, the P-GW 14 is also ready to apply the APN-AMBR parameter (e.g. using its rate enforcement module 105) for the UE-R's 3-2 communications with the network, via that P-GW 14 (although it will be appreciated that at this point there may be no communications taking place via that P-GW 14 yet).

In step S615, the user communication device 3-1 (which is currently located outside the coverage of the base station 5) and the UE-R 3-2 perform (using their respective D2D modules 48) a relay PDN connection establishment procedure with the network (e.g. the MME 11 and the P-GW 14 serving the user communication device 3-1). Although not shown in FIG. 6, the PDN connection establishment procedure may be preceded by an appropriate relay discovery procedure, which may be initiated by either user communication device by transmitting an appropriate D2D beacon. It is noted that the relay discovery procedure may comprise exchanging one or more signalling messages between the user communication devices 3-1 and 3-2 (and possibly involving the base station 5 and/or a core network 7 entity, e.g. the MME 11).

Upon receipt of the new (relay) PDN connection establishment request from the UE-R 3-2, for which a PDN connection has already been established at S605, the MME 11 proceeds to recalculate the values for the UE-AMBR and the APN-AMBR parameters in place for the UE-R 3-2 so that the new values take into account the potential increase in required bit rates, for the UE-R 3-2 and the access points serving the UE-R 3-2, as a result of relaying.

Thus, in step S616, the MME 11 calculates (using its AMBR configuration module 85) a new value for the UE-AMBR parameter for the UE-R 3-2 whilst the UE-R 3-2 is relaying traffic for other user communication devices. However, this time the MME 11 (the AMBR configuration module 85) calculates the UE-AMBR for the UE-R 3-2 using the following equation.

$$UE\text{-}AMBR = \text{Min}[\Sigma(HSS\_APN\text{-}AMBR \text{ of active APNs}), HSS\_UE\text{-}AMBR] + \text{Min}[\Sigma(HSS\_APN\text{-}Relay\text{-}AMBR \text{ of relaying APNs}), HSS\_UE\text{-}Relay\text{-}AMBR]$$

In other words, the UE-AMBR parameter is set to be the sum of: i) the smaller of the sum of all HSS_APN-AMBR parameters of active APNs and the HSS-UE-AMBR parameter; and ii) the smaller of the sum of all HSS_APN-Relay-AMBR parameters of relaying APNs and the HSS-UE-Relay-AMBR parameter.

In response to the relay PDN connection establishment and following the computation of the new UE-AMBR parameter, the MME 11 generates (using its communication control module 83) and sends, at step S617, an appropriately formatted signalling message (e.g. an "Initial Context Setup" message) to the base station 5 for registering the successful relay PDN connection establishment for the UE-R 3-2 (via the base station 5). The MME 11 includes in this message the new UE-AMBR parameter it calculated at S616, to be applied by the base station 5 for the UE-R's 3-2 communications.

Upon receipt of the MME's 11 message, as shown in step S619, the base station 5 (e.g. using its rate enforcement module 65) is ready to apply the new UE-AMBR parameter for the UE-R's 3-2 subsequent communications with the network (both uplink and downlink). In other words, step S619 can be regarded as an update for the UE-AMBR parameter that was provided in step S609.

Although not shown in FIG. 6, the MME 11 also calculates (e.g. as part of step S616 or in a different step) respective APN-Relay-AMBR parameters for each access point that the UE-R 3-2 is authorised to use, and provides the applicable APN-Relay-AMBR parameters to each P-GW 14-1, 14-2 serving the UE-R 3-2. Thus, as shown in step S620, the P-GW 14 is also ready to apply the APN-Relay-AMBR parameter (e.g. using its rate enforcement module 105) for the UE-R's 3-2 subsequent communications with the network, via that P-GW 14.

In this embodiment, the P-GW 14 is able to distinguish between the UE-R's 3-2 relayed traffic and native traffic. For example, the P-GW 14 may rely on appropriate TFT mechanisms, IP address and/or IP level parameter based filtering, port number filtering, and/or any other appropriate traffic information filtering to distinguish between relayed traffic and native traffic.

Advantageously, as generally shown at step S620, the P-GW 14 (using its rate enforcement module 105) is now able to perform rate enforcement in communicating data packets (e.g. uplink or downlink user plane data) for the user communication device 3-1 as well. It is noted, however, that the P-GW 14 (its rate enforcement module 105) also continues to perform rate enforcement, which it started in step S610, for the UE-R's 3-2 own data packets. Thus, the traffic received at step S621 may comprise data packets for the relayed user communication device 3-1 and/or the UE-R 3-2 (and possibly data packets for any other user communication device connected to the UE-R 3-2). Further details of the packet handling by the P-GW 14 are illustrated with reference to FIG. 7 below.

Once the rate configuration is complete, the P-GW 14 can forward, at steps S623a and S623b, data packets communicated on the associated EPS bearer(s) to the UE-R 3-2 (via the base station 5), in dependence on the applicable APN- AMBR and/or APN-Relay-AMBR parameters provided for the UE-R 3-2 during the PDN connection establishment.

From the base station 5, user data for the UE-R 3-2 is transmitted to the UE-R 3-2 (at step S625*a*, and after performing rate enforcement based on the UE-AMBR parameter at step S619), and user data for the relayed user communication device 3-1 is transparently relayed by the UE-R 3-2 towards the user communication device 3-1 (at step S625*b*, and after performing rate enforcement based on the UE-AMBR parameter at step S619).

Beneficially, in this embodiment, there is no need for the base station 5 to distinguish between data packets for the UE-R 3-2 and data packets for relayed user communication devices 3-1, 3-3, since the MME 11 provided, at step S617, an updated UE-AMBR parameter for the UE-R 3-2 in response to establishing a relay PDN connection via the UE-R 3-2. It will be appreciated that the MME 11 may update the applicable UE-AMBR parameter (i.e. repeat steps S616 and S617) whenever there is a change in the UE-R's 3-2 PDN connection (S605) and/or relay PDN connection (S615), e.g. whenever a PDN connection is established and/or terminated for the UE-R 3-2.

Figure 7:
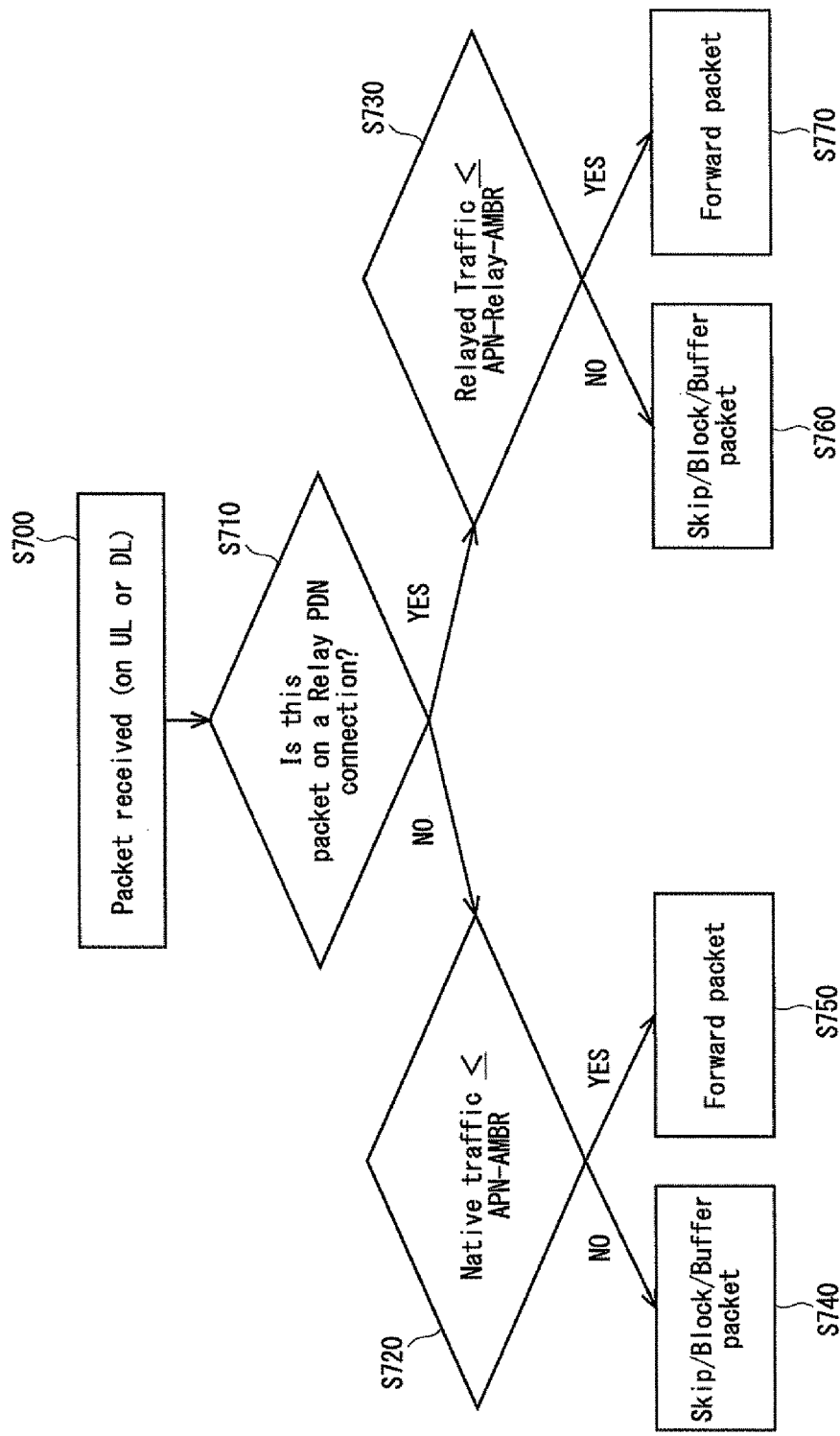
FIG. 7 is a flow chart illustrating an exemplary way in which packet handling may be realised in a gateway in accordance with FIG. 6.

FIG. 7 is a flow chart illustrating an exemplary way in which packet handling may be realised in a PDN gateway 14 in accordance with FIG. 6.

The procedure starts at step S700, in which the P-GW 14 receives a packet to/from the UE-R 3-2. In order to determine whether or not the packet can be forwarded, the P-GW 14 proceeds to step S710, in which the P-GW 14 (i.e. its rate enforcement module 105) checks whether the received packet belongs to a relay PDN connection. If the result of this check indicates that the received packet does not belong to a relay PDN connection (step S710: "NO"), then the P-GW 14 proceeds to step S720. However, if the result of this check indicates that the received packet belongs to a relay PDN connection (step S710: "YES"), then the P-GW 14 proceeds to step S730.

In step S720, the P-GW 14 (i.e. its rate enforcement module 105) checks whether the normal (i.e. non-relayed) traffic for the UE-R 3-2 is below its associated aggregate maximum bit rate via that P-GW 14 (APN-AMBR). If the result of this check indicates that the normal traffic for the UE-R 3-2 has reached or exceeded (i.e. it is not below) its associated aggregate maximum bit rate via that P-GW 14 (step S720: "NO"), then the rate enforcement module 105 blocks transmission of the received packet, at step S740, and returns to step S700 for processing the next packet (i.e. the P-GW 14 skips the current packet and proceeds to the next packet).

However, if the result of the check at S720 indicates that the normal traffic for the UE-R 3-2 is below its associated aggregate maximum bit rate via that P-GW 14 (step S720: "YES"), then the rate enforcement module 105 instructs, at step S750, the communication control module 103 to forward the processed packet towards its destination. The P-GW 14 then returns to step S700 for processing the next packet.

Returning now to step S730, the P-GW 14 (i.e. its rate enforcement module 105) checks whether the relayed traffic for the UE-R 3-2 is below its associated aggregate maximum bit rate via that P-GW 14 (APN-Relay-AMBR). If the result of this check indicates that the relayed traffic for the UE-R 3-2 has reached or exceeded (i.e. it is not below) its associated aggregate maximum bit rate via that P-GW 14 (step S730: "NO"), then the rate enforcement module 105 blocks transmission of the received packet, at step S760, and returns to step S700 for processing the next packet (i.e. the P-GW 14 skips the current packet and proceeds to the next packet).

However, if the result of the check at S730 indicates that the relayed traffic for the UE-R 3-2 is below its associated aggregate maximum bit rate via that P-GW 14 (step S730: "YES"), then the rate enforcement module 105 instructs, at step S770, the communication control module 103 to forward the processed packet towards its destination. The P-GW 14 then returns to step S700 for processing the next packet.

Figure 8:
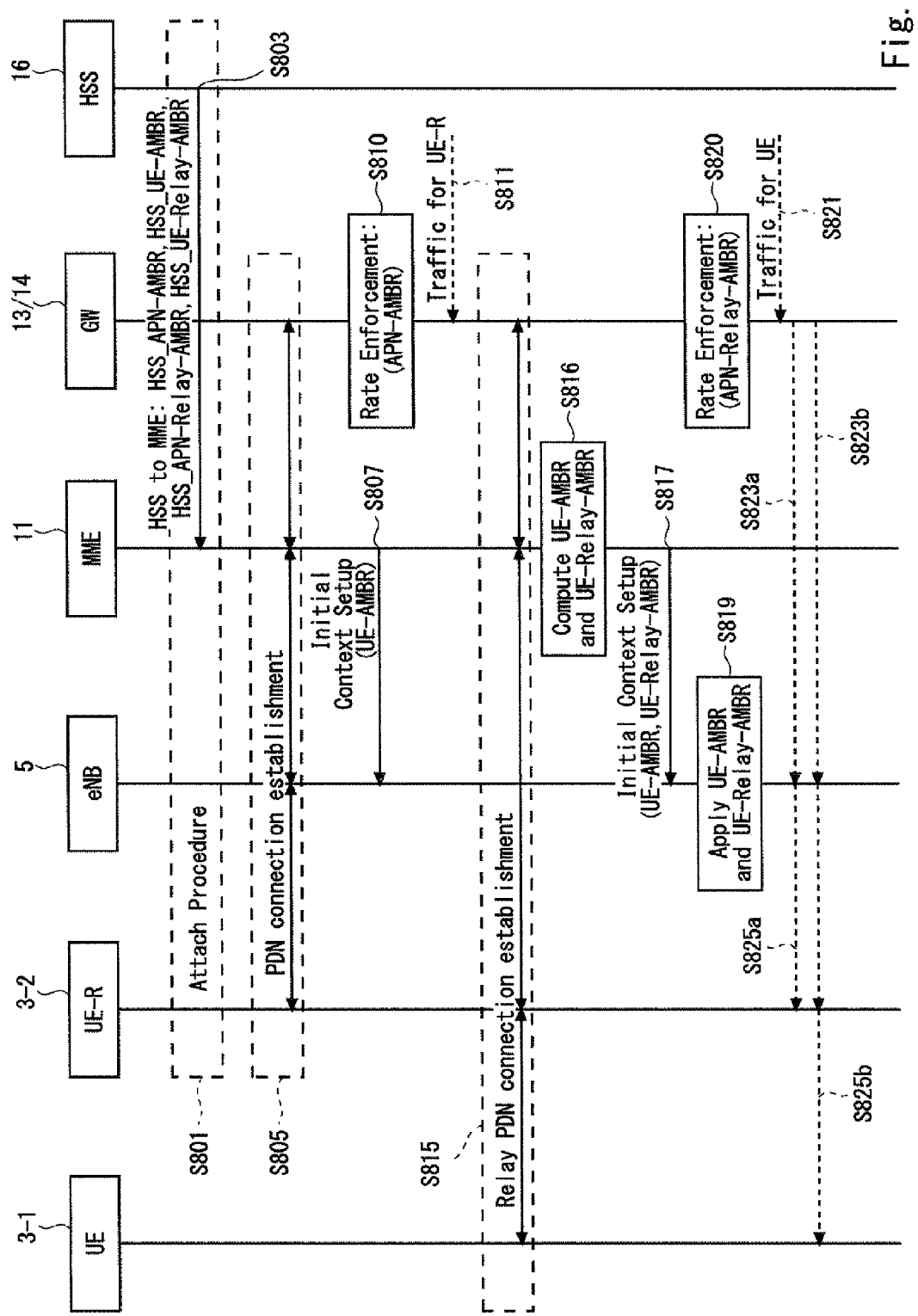
FIG. 8 is a timing diagram illustrating an exemplary way in which rate enforcement may be realised in the system shown in FIG. 1.

FIG. 8 is a timing diagram illustrating an exemplary way in which rate enforcement may be realised in the system 1 shown in FIG. 1. In this example, packet forwarding is controlled using an AMBR value that defines the maximum additional traffic allowed for relaying via the UE-R 3-2.

In this embodiment, it is assumed that the serving base station 5 is able to distinguish (or has means to distinguish) between the UE-R's 3-2 normal (non-relayed, or "native") traffic and relayed traffic.

For example, the base station 5 may be configured to maintain information identifying the various bearers (e.g. bearer IDs) used by the UE-R 3-2 for relaying and/or it native traffic. The base station 5 may use other information as well, e.g. information obtained during PDN connection establishment. The base station 5 may also be able to distinguish between the UE-R's 3-2 own traffic and relayed traffic based on header information, information relating to packets transmitted through the base station's 5 connection (e.g. a GTP-U connection) with the S-GW 13, and/or information identifying the type of transmitted data (e.g. a flag indicating that a certain data packet is to be relayed). Some examples of distinguishing between native traffic and relayed traffic are described in more detail with reference to FIGS. 11 to 13 below.

Steps S801 to S815 of this embodiment correspond to steps S601 to S615 of FIG. 6, respectively, and their description is omitted here for simplicity.

The HSS 16 holds, amongst others, the following subscription parameters for the UE-R 3-2: HSS_APN-AMBR, HSS_UE-AMBR, HSS_APN-Relay-AMBR, and HSS_UE-Relay-AMBR. These parameters correspond to the ones described above with reference to FIG. 6.

However, in step S816 of this embodiment, the MME 11 computes (using its AMBR configuration module 85) two different rate enforcement parameters for the base station 5: i) a UE-AMBR parameter (e.g. as specified in the 3GPP TS 23.401 standard) to be applied for the UE-R's 3-2 native traffic; and ii) a UE-Relay-AMBR parameter to be applied for the UE-R's 3-2 relayed traffic. The UE-AMBR parameter is set to be the smaller of the sum of all HSS_APN-AMBR parameters of active APNs and the HSS-UE-AMBR parameter. The UE-Relay-AMBR parameter is set to be the smaller of the sum of all HSS_APN-Relay-AMBR parameters of active APNs and the HSS-UE-Relay-AMBR parameter.

Specifically, the AMBR configuration module 85 uses the following equations:

$$\text{UE-AMBR} = \text{Min}[\Sigma(\text{HSS\_APN-AMBR of active APNs}), \text{HSS\_UE-AMBR}]$$

and $$\text{UE-Relay-AMBR} = \text{Min}[\Sigma(\text{HSS\_APN-Relay-AMBR of active APNs}), \text{HSS\_UE-Relay-AMBR}].$$

Next, the MME 11 generates (using its communication control module 83) and sends, at step S817, an appropriately formatted signalling message (e.g. an "Initial Context Setup" message) to the base station 5 for registering the successful relay PDN connection establishment for the UE-R 3-2 (via the base station 5). The MME 11 includes in this message the UE-AMBR parameter and the UE-Relay-AMBR parameter it calculated at step S816, to be applied by the base station 5 for the UE-R's 3-2 native and relayed communications, respectively.

Upon receipt of the MME's 11 message, as shown in step S819, the base station 5 (e.g. using its rate enforcement module 65) is ready to apply the received UE-AMBR parameter for the UE-R's 3-2 native communications with the network (both uplink and downlink), and to apply the received UE-Relay-AMBR parameter for the UE-R's 3-2 relayed communications with the network (both uplink and downlink).

Although not shown in FIG. 8, the MME 11 (using its AMBR configuration module 85) also computes the following parameters for each P-GW 14-1, 14-2 that the UE-R 3-2 is allowed to use the following equations:

APN-AMBR=HSS_APN-AMBR and

APN_Relay_AMBR=HSS_APN_Relay_AMBR.

Therefore, as shown in step S820, the P-GW 14 (using its rate enforcement module 105) is now ready to apply the APN-Relay-AMBR parameter (e.g. using its rate enforcement module 105) for relayed communications (which are generally shown at step S821) associated with the UE-R's 3-2, via that P-GW 14. It is noted, however, that the P-GW 14 (its rate enforcement module 105) also continues to perform rate enforcement, i.e. that it started in step S810, for the UE-R's 3-2 own (native) data packets (which are generally shown at step S811). The packet handling procedure by the P-GW 14 in this embodiment corresponds to the procedure described with reference to FIG. 7 above.

Once the rate configuration is complete, the P-GW 14 can forward, at steps S823a and S823b, data packets communicated on the associated EPS bearer(s) to the UE-R 3-2 (via the base station 5), in dependence on the applicable APN-AMBR and/or APN-Relay-AMBR parameters provided for the UE-R 3-2 during the PDN connection establishment.

From the base station 5, user data for the UE-R 3-2 is transmitted to the UE-R 3-2 (at step S825a, and after performing rate enforcement, at step S819, based on the UE-AMBR parameter), and user data for the relayed user communication device 3-1 is transparently relayed by the UE-R 3-2 towards the user communication device 3-1 (at step S825b, and after performing rate enforcement, at step S819, based on the UE-Relay-AMBR parameter).

Advantageously, in this embodiment, the base station 5 is able to apply distinct rate enforcement (AMBR) rules for the UE-R's 3-2 native (non-relayed) traffic and for its relayed traffic as well.

Figure 9:
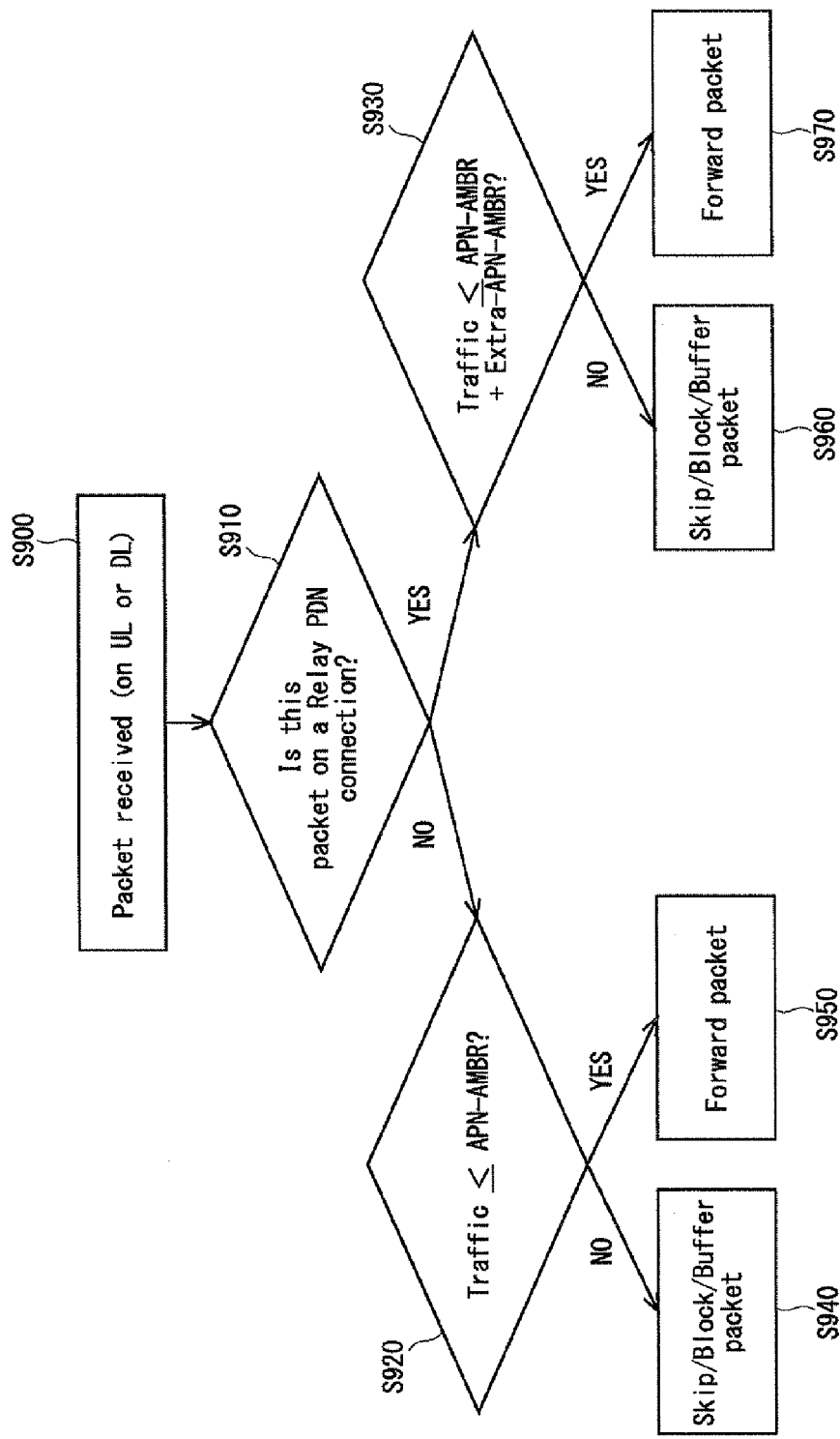
FIG. 9 is a flow chart illustrating an exemplary way in which packet handling may be realised in a gateway.

FIG. 9 is a flow chart illustrating an exemplary way in which packet handling may be realised in a PDN gateway 14 in an alternative embodiment.

Steps S900 to S920, S940, and S950 correspond to steps S700 to S720, S740, and S750 of FIG. 7, respectively, and their description is omitted here for simplicity. However, in this example, the P-GW 14 is configured to carry out rate enforcement, at step S930, using an AMBR value that defines a maximum additional traffic (e.g. relayed traffic) allowed via the UE-R 3-2 (on top of the UE-R's 3-2 regular traffic).

In this embodiment, the HSS 16 holds a parameter (e.g. an "HSS_Extra-APN-AMBR" parameter) specifying the maximum additional traffic allowed for relaying purpose for the UE-R 3-2, via a given access point, i.e. the rate of traffic that the UE-R 3-2 is allowed to send/receive on top of its native traffic (APN-AMBR). It will be appreciated that an appropriate HSS_Extra-APN-AMBR parameter may be defined for each access point (P-GW 14-1, 14-2) that the UE-R 3-2 is allowed to use. However, a common HSS_Extra-APN-AMBR parameter may be used for all access points, if appropriate.

The MME 11 provides the applicable HSS_Extra-APN-AMBR parameter (or a corresponding "Extra-APN-AMBR" parameter determined by the MME 11) to each P-GW 14-1, 14-2 that the UE-R 3-2 is allowed to use. Therefore, each P-GW 14 can derive the rate of allowed relayed traffic via that P-GW as the sum of non-relayed bit rate allowance and additional bit rate allowance, i.e. as the sum of HSS_APN-AMBR and HSS_Extra-APN-AMBR (or APN-AMBR and Extra-APN-AMBR). Alternatively, the MME 11 can derive the sum of these values and provide a single parameter.

The HSS 16 also holds a parameter (e.g. an "HSS_Extra-UE-AMBR" parameter) specifying the maximum additional traffic allowed for relaying purpose for the UE-R 3-2, across all access points, i.e. the rate of total extra traffic that the UE-R 3-2 is allowed to send/receive on top of its native traffic allowance (UE-AMBR). The MME 11 obtains this parameter from the HSS 16 (e.g. as described above with reference to step S603), and it computes (using its AMBR configuration module 85) the UE-AMBR for the serving base station 5, using the following equation.

UE-AMBR=Min[Σ(HSS_APN-AMBR of active APNs),HSS_UE-AMBR]+Min[Σ(Extra-APN-AMBR of active APNs),HSS_Extra-UE-AMBR]

This is similar to the calculation performed at step S616 above. However, in this case the AMBR configuration module 85 uses the corresponding maximum additional traffic parameters (Extra-APN-AMBR and HSS_Extra-UE-AMBR) instead of the maximum relayed traffic parameters used in step S616 (HSS_APN-Relay-AMBR and HSS_UE-Relay-AMBR, respectively).

Thus, in step S930, the P-GW 14 (i.e. its rate enforcement module 105) checks whether the total (native+relayed) traffic for the UE-R 3-2 is below the sum of its associated aggregate maximum bit rate via the P-GW 14 (APN-AMBR) and the additional aggregate maximum bit rate for relayed traffic via the P-GW 14 (Extra-APN-AMBR). If the result of this check indicates that the total traffic for the UE-R 3-2 has reached or exceeded (i.e. it is not below) the sum of the associated aggregate maximum bit rates allowed via that P-GW 14 (step S930: "NO"), then the rate enforcement module 105 blocks transmission of the processed packet, at step S960, and returns to step S700 for processing the next packet (i.e. the P-GW 14 skips the current packet and proceeds to the next packet).

However, if the result of the check at S930 indicates that the relayed traffic for the UE-R 3-2 is below the sum of the associated aggregate maximum bit rates allowed via that P-GW 14 (step S930: "YES"), then the rate enforcement module 105 instructs, at step S970, the communication control module 103 to forward the processed packet towards its destination. The P-GW 14 then returns to step S900 for processing the next packet.

FIG. 10A illustrates an exemplary rate enforcement scenario in accordance with FIG. 7, and FIG. 10B illustrates an exemplary rate enforcement scenario in accordance with FIG. 9.

<Distinguishing Between Native and Relayed Traffic—Using GTP-U>

The following is a description of a possible way the serving base station 5 can distinguish (e.g. in step S819 described above) between the UE-R's 3-2 native traffic and any relayed traffic, such as traffic for the user communication device 3-1.

Figure 11:
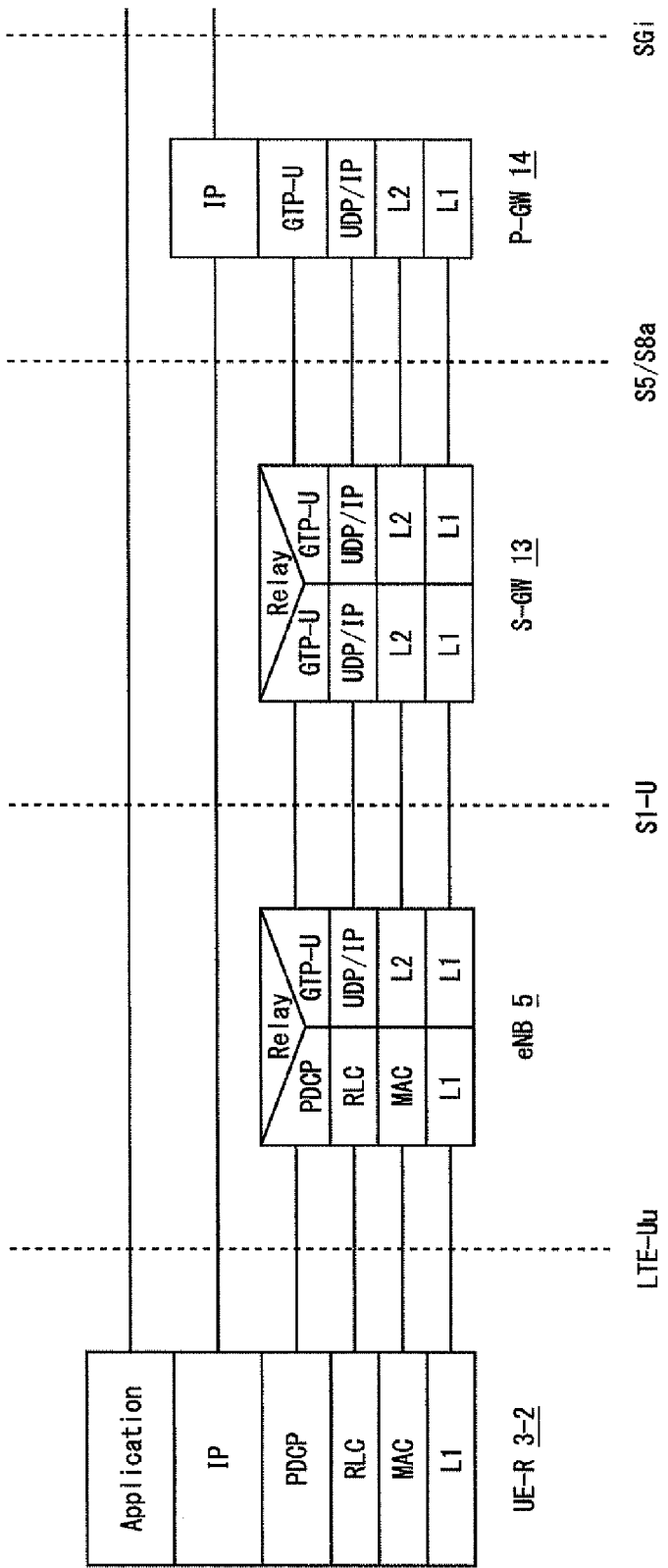
FIG. 11 illustrates schematically exemplary user-plane protocol stacks of the elements shown in FIG. 1.

FIG. 11 illustrates schematically exemplary protocol stacks of the elements shown in FIG. 1 involved in the relaying of user-plane data between the UE-R 3-2 and the communication network 1 (both uplink and downlink data).

FIG. 11 shows the base station 5, the S-GW 13, and the P-GW 14 serving the UE-R 3-2. Although the UE-R 3-2 (and/or any relayed user communication device connected to the UE-R 3-2) might be served by more than one P-GW (e.g. both P-GW 14-1 and P-GW 14-2 shown in FIG. 1), only one of such P-GWs is shown for simplicity.

As can be seen, user-plane (e.g. IP/application) signalling is relayed between the UE-R 3-2 and the base station 5 serving the UE-R 3-2 using the services of the Packet Data Convergence Protocol (PDCP) layer, the Radio Link Control (RLC) layer, the (Media Access Control) MAC layer, and the Layer-1 (L1) layer. The user-plane signalling is relayed over the GTP-U layer between the base station 5 serving the UE-R 3-2 and the S-GW 13, and also between the S-GW 13 and the P-GW 14, which terminates the bearer (e.g. an EPS bearer for the UE-R 3-2) within the core network 7.

Although not shown in FIG. 11, the UE-R 3-2 and/or any relayed UE connected to it may communicate with an endpoint beyond the P-GW 14, using an appropriate extension of the UE-R's 3-2 (and/or the relayed UE's) bearer with the P-GW 14. Such a communication endpoint may be reached via e.g. the core network 7 (over another EPS bearer and/or the like) or the external network 10 (e.g. over an external bearer). Relayed traffic between the UE-R 3-2 and any relayed UE (not shown in FIG. 11) may be communicated using appropriate device-to-device communication technologies, such as ProSe communication technologies and/or the like.

GTP-U (General Packet Radio Service Tunnelling Protocol for the user-plane) is a protocol for transmitting (user-plane) packets between the P-GW 14, the S-GW 13, and the base station 5. The GTP-U is described in more detail in 3GPP TS 29.281, the contents of which are incorporated herein by reference.

GTP-U facilitates, amongst others, mobility services by providing a tunnel (or tunnels), for each user communication device 3 (such as the UE-R 3-2), between the base station 5 serving that user communication device 3 and its associated P-GW 14 (via the S-GW 13). If the user communication device 3 uses more than one P-GWs 14, a separate tunnel is provided between each P-GW 14 and the serving base station 5. Thus, when the user communication device 3 moves (is handed over) between base stations, any data packets for that user communication device 3 are then forwarded between the P-GW(s) 14 and the new serving base station via the S-GW 13 (using the tunnelling mechanism provided by the GTP-U) without having to change the IP address allocated for the user communication device 3.

This is possible, because each GTP-U tunnel is associated with a set of identifiers comprising at least a Tunnel End ID (TEID), an IP address and a user datagram protocol (UDP) port number. The set of identifiers are kept by each node (GTP-U entities) via which the tunnel is provided, such as the base station 5, the S-GW 13, and the P-GW 14, and when the user communication device 3 is handed over, the set of identifiers are provided to the new base station (and removed from the old base station). Thus, regardless of which base station 5 is currently serving the user communication device 3, the set of identifiers ensure that data packets for that user communication device 3 can be communicated using the same IP address.

Table 1 below illustrates the fields of a GTP-U header that may be used in the communication system 1 shown in FIG. 1.

TABLE 1

| | GTP-U header | | | | | | |
|---|---|---|---|---|---|---|---|
| | Bits | | | | | | |
| Octets | 8 | 7 | 6 | 5 | 4 | 3 | 2 | 1 |
| 1 | Version* | | | PT | (spare)* | E | S | PN |
| 2 | Message Type* | | | | | | | |
| 3 | Length ($1^{st}$ Octet) | | | | | | | |
| 4 | Length ($2^{nd}$ Octet) | | | | | | | |
| 5 | Tunnel Endpoint Identifier ($1^{st}$ Octet) | | | | | | | |
| 6 | Tunnel Endpoint Identifier ($2^{nd}$ Octet) | | | | | | | |
| 7 | Tunnel Endpoint Identifier ($3^{rd}$ Octet) | | | | | | | |
| 8 | Tunnel Endpoint Identifier ($4^{th}$ Octet) | | | | | | | |
| 9 | Sequence Number ($1^{st}$ Octet) | | | | | | | |
| 10 | Sequence Number ($2^{nd}$ Octet) | | | | | | | |
| 11 | N-PDU Number | | | | | | | |
| 12 | Next Extension Header Type* | | | | | | | |

As can be seen, each GTP-U header includes twelve octets of information, each octet (shown in rows #1 to #12) comprising eight bits (shown in columns #1 to #8). In this example, one or more of the GTP-U header fields marked by an * sign in Table 1 may be used to indicate whether the data packet associated with the GTP-U header comprises native or relayed traffic.

Specifically, an indication of native and/or relayed traffic may be provided using one or more of the following options:

i) a specific GTP-U version (octet #1, bits #6 to #8);

ii) a specific indication included in octet #1, bit #4 (currently not in use);

iii) a specific GTP-U message type (octet #2); and iv) a specific GTP-U next extension header type (octet #12).

If option "i" is used, then a specific GTP-U header version number (either alone or in combination with one or more of options "ii" to "iv") may be used to indicate that the type of traffic present in the payload associated with that GTP-U header comprises relayed traffic (or comprises native traffic).

If option "ii" is used, e.g. in combination with a specific GTP-U version number, then bit #4 of octet #1 may be set to a specific value (e.g. "1") in case of relayed traffic in the GTP-U payload and set to a different value (e.g. "0") in case of native traffic in the GTP-U payload, or vice versa.

If option "iii" is used, e.g. in combination with a specific GTP-U version number (option "i"), then the message type (octet #2) may be set to a specific value indicating the type of traffic included in the GTP-U payload, e.g. the message type may be set to a value corresponding to "relayed traffic" or "non-native traffic" in case of relayed traffic; and set to a different value, such as a value corresponding to "normal traffic", "native traffic", or "non-relayed traffic" in case of the UE-R's 3-2 native traffic.

The values for the GTP-U Message Type are summarised in Table 2 below, which are defined (and/or reserved) in the following 3GPP specifications:

3GPP TS 29.060 "General Packet Radio Service (GPRS); GPRS Tunnelling Protocol (GTP) across the Gn and Gp interface";

3GPP TS 32.295 "Telecommunication management; Charging management; Charging Data Record (CDR) transfer"; and 3GPP TS 29.281 "General Packet Radio System (GPRS) Tunnelling Protocol User Plane (GTPv1-U)".

TABLE 2

Message Type values

| Message Type value (Decimal) | Message | GTP-C | GTP-U | GTP' |
|---|---|---|---|---|
| 1 | Echo Request | X | X | X |
| 2 | Echo Response | X | X | X |
| 3-25* | Reserved in 3GPP TS 32.295 and 3GPP TS 29.060 | | | |
| 26 | Error Indication | | X | |
| 27-30* | Reserved in 3GPP TS 29.060 | | | |
| 31 | Supported Extension Headers Notification | X | X | |
| 32-253* | Reserved in 3GPP TS 29.060 | | | |
| 254 | End Marker | | X | |
| 255 | G-PDU | | X | |

Some possible ranges from which an appropriate value (or values) may be selected for indicating the type of traffic (native/relayed) are marked by an * sign in Table 2. It will be appreciated that any one (or more) of the message type values that are currently unallocated (e.g. message type values 0, 8 to 15, 24, 25, 38 to 47, 61 to 69, 71 to 95, 106 to 111, 122 to 127, 130 to 239, and 242 to 253) may be used to indicate relayed traffic and a different value (selected either from the same set of currently unallocated values or from a different set of values) may be used to indicate native traffic.

If option "iv" is used, e.g. in combination with a specific GTP-U version number (option "i"), then the next extension header type field (octet #12) may be set to a specific value (with the flag "E" (octet #1, bit #3) set to "1") indicating that there is a specific next extension header type field present following the GTP-U header (e.g. in an appropriate portion of the GTP payload). In this case, the specific next extension header following the GTP-U header is configured to indicate the type of traffic included in the GTP-U payload, e.g. the specific next extension header may be set to a value corresponding to "relayed traffic" or "non-native traffic" in case of relayed traffic; and set to a different value, such as a value corresponding to "normal traffic", "native traffic", or "non-relayed traffic" in case of the UE-R's 3-2 native traffic. It will be appreciated, that (in accordance with 3GPP TS 29.281) the next extension header type field is normally present if and only if any one or more of the S, PN and E flags are set in the GTP header. Further, the GTP-U entities are configured to process the next extension header type field only when its presence is indicated by the "E" flag set to the value "1". Further details of the GTP-U extension headers are specified in 3GPP TS 29.281, the contents of which are incorporated herein by reference.

Advantageously, using options "i" to "iv", the GTP-U protocol can be adapted to carry information about the type of traffic (native/relayed) present in the GTP-U payload. Then, based on the information included in the GTP-U protocol fields, the serving base station 5 is able to distinguish between the UE-R's 3-2 native and relayed traffic and hence enforce (e.g. as described with reference to step S819 above), for both uplink and downlink communications, the corresponding AMBR value (UE-AMBR/UE-Relay-AMBR) in dependence on the type of traffic. In particular, the serving base station 5 (using its rate enforcement module 65) may be configured to carry out a similar process to the process illustrated in FIG. 7 (substituting UE-AMBR for APN-AMBR, and UE-Relay-AMBR for APN-Relay-AMBR, as appropriate).

The type of traffic to be communicated over a particular bearer (or a particular GTP-U tunnel) may be initially indicated at setting up that bearer (or tunnel) and the appropriate indication of traffic type may then be included in the GTP-U header/payload whenever data is sent over that bearer. For example, the UE-R 3-2 (or the P-GW 14) may indicate the type of traffic in a suitable field of a request for creating a bearer for that traffic (e.g. a "Create Bearer Request" message or a "PDN Connectivity Request" message) it sends to the network (e.g. the MME 11). In this case the network is able to associate each bearer for the UE-R 3-2 with a traffic type and provide that association to the network nodes (base station 5, S-GW 13, and P-GW 14) handling that particular bearer.

It will be appreciated that the indication of traffic type may be provided to the network node using an appropriately formatted header included in an "EPS bearer request" message, a "create session request" message, and/or the like.

Since each EPS bearer is uniquely associated with one or more unique TEID, the traffic type indication may be also provided implicitly, based on the TEID (and maintaining an association between each TEID and the corresponding traffic type in the GTP-U entities).

Further, it will be appreciated that such an indication of traffic type (in an appropriately formatted header) can be included with any (user-plane) data packets (uplink and downlink) transmitted using the GTP-U. For example, a single bit of information may be used, e.g. the single bit set to "1" when the data comprises relayed data, and set to "0" when the data comprises relayed data (or vice versa).

<Distinguishing Between Native and Relayed Traffic—Using PDCP>

Instead of (or in addition to) adapting the GTP-U header (for communications between the base station 5 and the P-GW 14), it will be appreciated that the PDCP layer may also be adapted to indicate the type of traffic being communicated via the base station 5 serving the UE-R 3-2. Such a PDCP based indication of traffic type may be particularly advantageous in the case of uplink traffic (from/via the UE-R 3-2 to the base station 5).

In this case, the PDCP layer of the UE-R 3-2 may be configured to provide, to the serving base station 5, information identifying the traffic type based the path (source) of data packets which can be differentiated by the UE-R 3-2 internally. This is possible because the UE-R 3-2 knows whether the source of a particular packet is a local IP address associated with the UE-R 3-2 itself (in case of native traffic) or an IP address associated with a D2D interface towards another user communication device (in case of relayed traffic). However, it will be appreciated that the UE-R 3-2 may identify the source of a particular data packet based on any suitable information (e.g. a UDP port number) included in the header (e.g. IP header) of that data packet. In this example therefore, the UE-R 3-2 is configured to add traffic type information (if not already present) to the PDCP header (e.g. to a suitable field thereof), and the serving base station 5 is configured to distinguish between the UE-R's 3-2 native and relayed traffic based on the information included in the PDCP header.

Specifically, the PDCP header may include information identifying (relayed/native) data packets to be sent on the uplink (from the UE-R 3-2 to the base station 5) when the UE-R 3-2 requests the network (base station 5) to grant communication resources for sending uplink data to the network. Thus, when the UE-R 3-2 associates the requested grant with relayed traffic (data packets sent for a different UE, based on the source of such data packets), it indicates in the PDCP header, when sending the uplink data to the base station 5, the type of traffic to be relayed traffic. Alternatively, when the UE-R 3-2 associates the requested grant with normal traffic (its own data packets), it indicates in the PDCP header the type of traffic to be native (or non-relayed) traffic.

The base station 5 receiving the data packets from the UE-R 3-2 is thus able to distinguish between the UE-R's 3-2 native traffic and relayed traffic by reading the traffic type indication included in the PDCP header from the UE-R 3-2.

It will be appreciated that information relating to the traffic type may be added by the relayed UE itself (in which case the UE-R 3-2 does not need to add this information), for example, when there is a PDCP connection between the relayed UE and the network (in which case relayed PDCP headers may or may not be processed by the UE-R 3-2).

<Distinguishing Between Native and Relayed Traffic— Using MAC>

Similarly to the PDCP based indication, the MAC layer may also be adapted to indicate the type of (uplink) traffic being communicated via the base station 5 serving the UE-R 3-2. In this example, a suitable Control Element (of the MAC protocol) is used to carry an indication whether or not the UE-R 3-2 is transmitting relayed data.

Advantageously, such a MAC based traffic type indication is provided when the UE-R 3-2 requests, using appropriately formatted MAC signalling, the serving base station 5 to allocate communication resources for transmitting uplink data. In other words, a traffic type indication may be provided to the serving base station 5 before transmission of the associated data, which further optimises the usage of communication resources over the air interface between the UE-R 3-2 and the base station 5. Thus, beneficially, the base station 5 applies different policies (i.e. a different grant or resource allocation behaviour) per data type (e.g. relayed/not-relayed). In this case, the UE-R 3-2 is configured to associate the requested grant with "relayed data" and when data packets are received, by the base station 5, on this particular grant, such data packets are considered to be related to "relayed data" (i.e. traffic originating from a different UE than the UE-R 3-2).

Specifically, if the UE-R 3-2 requests grant of uplink communication resources for relayed traffic (data packets to be sent for a different UE), then the UE-R 3-2 indicates, upon requesting the grant of uplink communication resources from the base station 5, in an appropriately formatted MAC Control Element (a relaying specific Control Element) that the type of traffic to be transmitted on the uplink comprises relayed traffic. When the requested grant is for normal traffic (data packets to be sent for the UE-R 3-2 itself), the UE-R 3-2 indicates in an appropriately formatted MAC Control Element (or indicates by omitting a relaying specific Control Element) that the type of traffic to be transmitted on the uplink comprises native (non-relayed) traffic.

The base station 5 receiving the data packets from the UE-R 3-2 maintains information on the rate of traffic for each traffic type, e.g. by keeping track of the already allocated communication resources (and/or successfully received data packets) for each traffic type. The base station 5 is thus able to distinguish between the UE-R's 3-2 grant requests for native traffic and for relayed traffic by checking the received MAC Control Element (if any) from the UE-R 3-2 and the base station 5 is able to allocate communication resources for the UE-R 3-2 in dependence on a comparison of the allocated communication resources (and/or successfully received data packets) to the appropriate parameter (UE-AMBR/UE-Relay-AMBR) for the corresponding traffic type.

It will be appreciated that the MAC (Control Element) based traffic type indication may also be used in a similar manner as the PDCP (header) based traffic type indication described above. In this case, regardless whether or not the traffic type was indicated upon the UE-R 3-2 requesting the grant of uplink communication resources, the UE-R 3-2 may be configured to include an appropriate indication of the traffic type (native/relayed) in an appropriately formatted MAC Control Element when it transmits the (native/relayed) data packet to the base station 5.

<Rate Enforcement at the Base Station>

Figure 12:
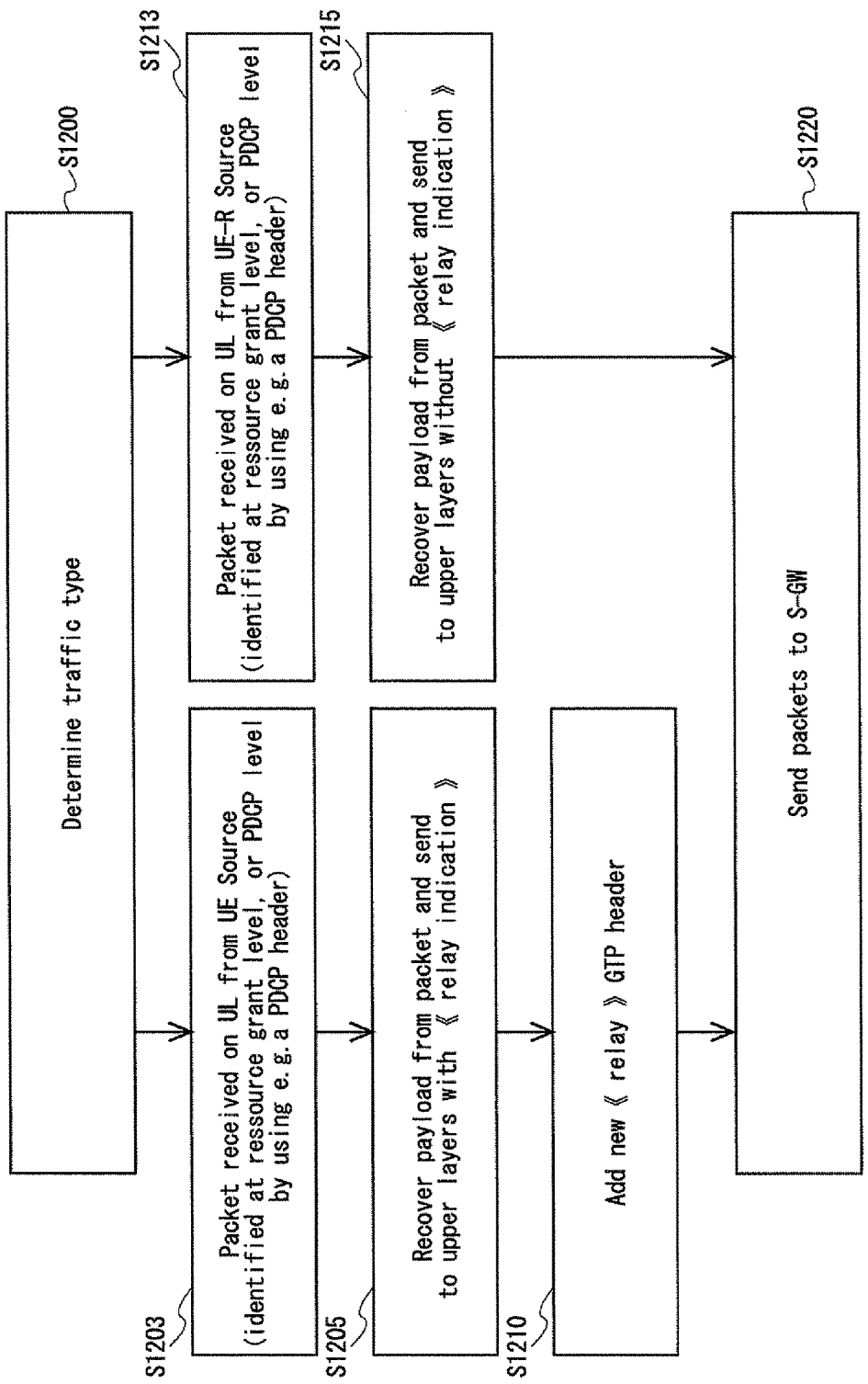
FIG. 12 is a flow chart illustrating an exemplary way in which uplink packet handling may be realised in the base station shown in FIG. 1.

FIG. 12 is a flow chart illustrating an exemplary way in which uplink packet handling may be realised in the base station 5 shown in FIG. 1.

In this case, it is assumed that the UE-R 3-2 (and/or the relayed UE) is able to indicate the type of traffic sent on the uplink using any of the above described GTP-U, PDCP, and/or MAC based techniques. Based on the traffic type indication, the serving base station 5 performs rate enforcement and forwards the received uplink data towards the S-GW 13/P-GW 14 in dependence on the bit rate value applicable to the indicated traffic type (UE-AMBR for native traffic and UE-Relay-AMBR for relayed traffic).

Specifically, for each data packet received (or to be received) from the UE-R 3-2, the rate enforcement module 65 of the base station 5 is configured to carry out the following procedure.

The procedure starts at step S1200, in which the base station 5 (using its rate enforcement module 65 and possibly with the assistance of its PDCP module 66 and/or its MAC module 67) determines the type of traffic associated with the UE-R's 3-2 packet sent (or requested to be sent) on the uplink. The rate enforcement module 65 may identify the traffic type either at resource grant stage (e.g. by checking the information included in, or omitted from, the MAC Control Element of the uplink grant request from the UE-R 3-2) or upon receiving the packet from the UE-R 3-2 (e.g. by checking the information included in, or omitted from, the MAC Control Element and/or the PDCP header of the uplink packet).

If in step S1200 the rate enforcement module 65 determines that the packet (or the request for transmitting the packet) originates from a UE other than the UE-R 3-2, i.e. it relates to relayed traffic, then it proceeds to step S1203. Otherwise, the rate enforcement module 65 proceeds to S1213.

In step S1203, the rate enforcement module 65 begins processing of the data packet by taking into account the corresponding UE-Relay-AMBR parameter. Specifically, the rate enforcement module 65 checks whether the rate of relayed traffic (or the sum of the rate of relayed and the rate of native traffic) for the UE-R 3-2 is below its associated aggregate maximum bit rate (UE-Relay-AMBR). If the result of this check indicates that the relayed traffic rate (or the sum of the rate of relayed and the rate of native traffic) for the UE-R 3-2 has reached or exceeded (i.e. it is not below) its associated aggregate maximum bit rate, then the rate enforcement module 65 blocks transmission of the packet and returns to step S1200 for processing the next packet (or the next uplink grant request).

However, if the result of the check at S1203 indicates that the relayed traffic rate (or the sum of the rate of relayed and the rate of native traffic) for the UE-R 3-2 is below its associated aggregate maximum bit rate, then the rate enforcement module 65 passes, in step S1205, (the payload of) the data packet (sent by the UE-R 3-2 after uplink resources have been granted for transmitting this packet) to upper layers including an appropriate indication that the data packet (the payload thereof) forms part of relayed traffic. For example, as shown in step S1210, the GTP-U module 68 may add information identifying the traffic type to an appropriately formatted GTP-U field (GTP header and/or payload).

Finally, in step S1220, the base station 5 (using its communication control module 53) forwards the processed packet (the payload thereof) to the S-GW 13 (e.g. using GTP-U). The rate enforcement module 65 then returns to step S1200 for processing the next packet (or the next uplink grant request).

If in step S1200 the rate enforcement module 65 determines that the processed packet originates from the UE-R 3-2, i.e. it comprises native traffic, then it proceeds to step S1213.

In step S1213, the rate enforcement module 65 begins processing of the data packet based on the corresponding UE-AMBR parameter for native traffic. Specifically, the rate enforcement module 65 checks whether the native traffic rate for the UE-R 3-2 is below its associated aggregate maximum bit rate (UE-AMBR). If the result of this check indicates that the native traffic rate for the UE-R 3-2 has reached or exceeded (i.e. it is not below) its associated aggregate maximum bit rate, then the rate enforcement module 65 blocks transmission of the processed packet and returns to step S1200 for processing the next packet (or the next uplink grant request).

However, if the result of the check at S1213 indicates that the native traffic rate for the UE-R 3-2 is below its associated aggregate maximum bit rate, then the rate enforcement module 65 passes, in step S1215, (the payload of) the data packet (sent by the UE-R 3-2 after uplink resources have been granted for transmitting this packet) to the upper layers without including a "relayed traffic" indication (although the rate enforcement module 65 may include an appropriate "native traffic" indication).

From step S1215, the rate enforcement module 65 proceeds to step S1220, in which the base station 5 (using its communication control module 53) forwards the processed packet (the payload thereof) to the S-GW 13. The rate enforcement module 65 then returns to step S1200 for processing the next packet (or the next uplink grant request).

Regardless of which type of indication (PDCP and/or MAC) is used by the UE-R 3-2, the base station 5 may advantageously use one or more of the GTP-U based indication when it forwards data packets to the associated P-GW 14 (via the S-GW 13). This in turn simplifies the processing required by the P-GW 14, because the P-GW 14 only needs to process the GTP-U for determining the type of traffic associated with the data packets forwarded by the base station 5.

Upon receipt of the data packets relayed by the base station 5 (via the S-GW 13) over the GTP-U tunnel, the P-GW 14 reads the GTP-U parameters associated with the data packets and identifies the type of traffic each data packet belongs to. Thus, when the P-GW 14 determines that a particular data packet received from the UE-R 3-2 comprises native traffic, its rate enforcement module 105 applies the corresponding APN-AMBR parameter when processing that data packet. However, when the P-GW 14 determines that a particular data packet received from the UE-R 3-2 comprises relayed traffic, its rate enforcement module 105 applies the corresponding APN-Relay-AMBR parameter when processing that data packet. This processing by the P-GW 14 essentially corresponds to the procedure described with reference to FIG. 7 (or FIG. 9) above; however, in this case the P-GW 14 performs rate enforcement for the UE-R's 3-2 uplink traffic (forwarded by the base station 5).

Figure 13:
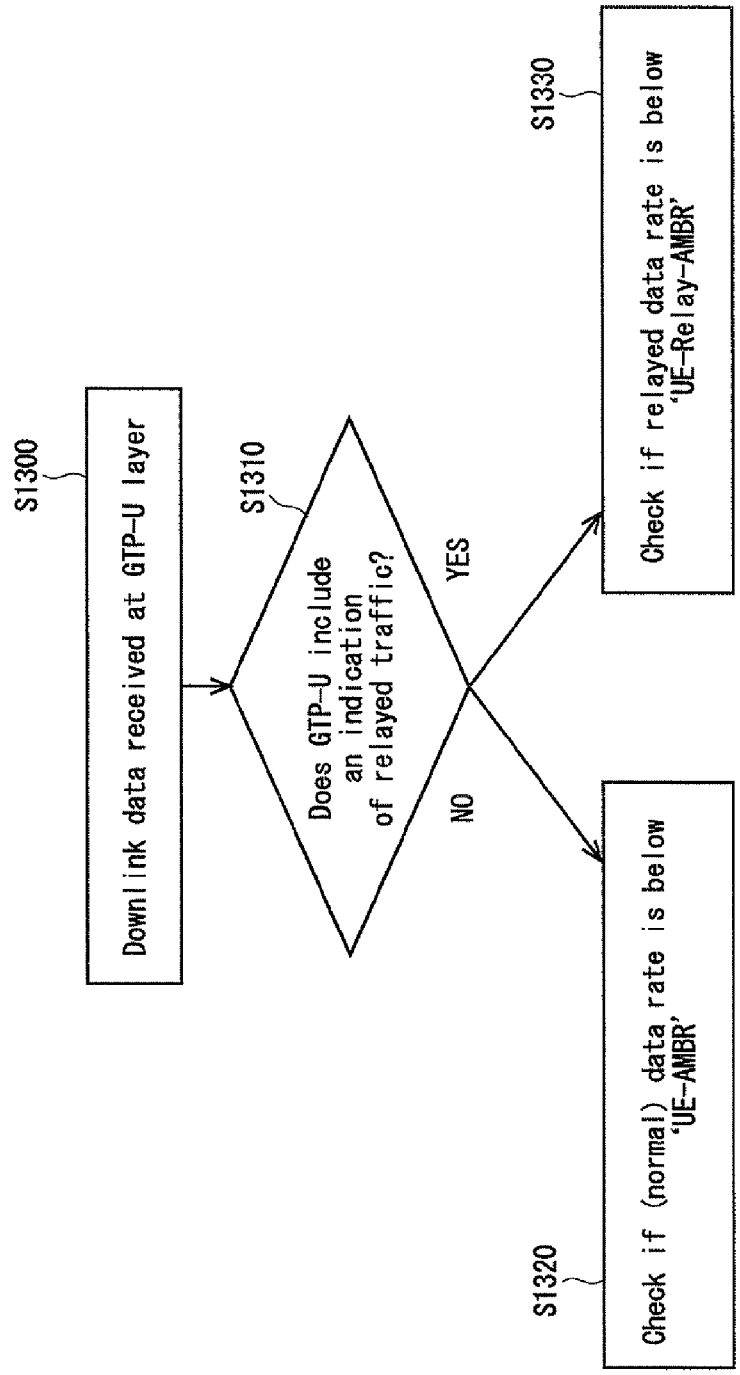
FIG. 13 is a flow chart illustrating an exemplary way in which downlink packet handling may be realised in the base station shown in FIG. 1.

FIG. 13 is a flow chart illustrating an exemplary way in which downlink packet handling may be realised in the base station 5 shown in FIG. 1.

In this case, it is assumed that the P-GW 14 is able to indicate the type of traffic using the above described GTP-U based technique. For example, the P-GW 14 can be configured to identify whether the traffic is to be relayed or not (e.g. by checking IP header information, such as an IP address and/or UDP port number), and set the native/relayed information included in the GTP-U header/payload accordingly.

Based on the traffic type indication, the serving base station 5 performs rate enforcement and transmits the received data to the UE-R 3-2 in dependence on the bit rate value applicable to the indicated traffic type (UE-AMBR for native traffic and UE-Relay-AMBR for relayed traffic).

Specifically, for each data packet to be transmitted to the UE-R 3-2, the rate enforcement module 65 of the base station 5 is configured to carry out the following procedure.

The procedure starts at step S1300, in which the base station 5 receives, from the P-GW 14 (via the S-GW 13), a data packet to be sent to the UE-R 3-2 on the downlink. The data packet includes a header and a payload.

In step S1310, the base station 5 (using its rate enforcement module 65) determines the type of traffic associated with the data packet received for the UE-R 3-2. The rate enforcement module 65 may identify the traffic type upon receiving the packet from the P-GW 14, for example, by checking whether an appropriate traffic type indication is included in (or omitted from) the GTP-U header/payload.

If the check at step S1310 indicates that the GTP-U header (or payload) does not comprise an indication that the processed data packet relates to relayed traffic (step S1310: "NO"), i.e. the data packet relates to normal (native) traffic, then the rate enforcement module 65 proceeds to step S1320, in which the rate enforcement module 65 checks whether or not the UE-R's 3-2 native (non-relayed) data rate has reached, exceeded, or it is still below the UE-R's 3-2 authorised data rate for that type of traffic.

Specifically, in step S1320, the rate enforcement module 65 checks whether the corresponding traffic rate for the UE-R 3-2 (e.g. its native traffic rate or the sum of its native traffic rate and its relayed traffic rate) is below its associated aggregate maximum bit rate (UE-AMBR). If the result of this check indicates that the corresponding traffic rate for the UE-R 3-2 has reached or exceeded (i.e. it is not below) its associated aggregate maximum bit rate, then the rate enforcement module 65 blocks transmission of the processed packet and returns to step S1300 for processing the next packet.

However, if the result of the check at S1320 indicates that the corresponding traffic rate for the UE-R 3-2 (e.g. its native traffic rate or the sum of its native traffic rate and its relayed traffic rate) is below its associated aggregate maximum bit rate, then the rate enforcement module 65 allows transmission of the processed data packet (the payload thereof) to the UE-R 3-2.

If the check at step S1310 indicates that the GTP-U header (or payload) comprises an indication that the processed data packet relates to relayed traffic (step S1310: "YES"), then the rate enforcement module 65 proceeds to step S1330, in which the rate enforcement module 65 checks whether or not the UE-R's 3-2 relayed (or native plus relayed) data rate has reached, exceeded, or it is still below the UE-R's 3-2 authorised data rate for that type of traffic.

Specifically, in step S1330, the rate enforcement module 65 checks whether the relayed (or native plus relayed) traffic rate for the UE-R 3-2 is below its associated aggregate maximum bit rate (UE-Relay-AMBR). If the result of this check indicates that the relayed (or native plus relayed) traffic rate for the UE-R 3-2 has reached or exceeded (i.e. it is not below) its associated aggregate maximum bit rate, then the rate enforcement module 65 blocks transmission of the processed packet and returns to step S1300 for processing the next packet.

However, if the result of the check at S1330 indicates that the relayed (or native plus relayed) traffic rate for the UE-R 3-2 is below its associated aggregate maximum bit rate, then the rate enforcement module 65 allows transmission of the processed data packet (the payload thereof) to the UE-R 3-2.

In summary, the above embodiments provide at least the following benefits:

- Flexibility: the allowed bit rate values may be fixed by the network operator at any level (e.g. network, cell, group of users, individual user level) according to the operator's policy and/or changed dynamically in dependence on situations (e.g. to account for an increase in relayed data and/or overall network load). This allows the network operator to find an optimal trade-off between allowing communications for the UE-R, for any relayed user communication devices, and for "regular" non-relayed user communication devices in the network.
- Operators are able to set and enforce distinct average maximum bit rates for normal traffic and for relayed traffic, on both downlink and uplink.
- It is possible to enforce the (native/relayed) AMBR parameters for the UE-R while it is roaming (i.e. when the UE-R is being served by a visited network rather than its home network).
- It is possible to enforce the (native/relayed) AMBR parameters for both eMBMS and non-eMBMS bearers since both use GTP-U.
- There is no need to create specific bearers or specific PDN connections for relayed traffic. This in turn results in a lower overall signalling overhead between the UE-R and the network and it makes it possible to reduce the risk of reaching the hard limit of maximum number (8) of data bearers per UE-R.
- Compatibility with current (Release 12) 3GPP standards (including ProSe). Compatibility can be maintained because (at least some of) the embodiments have no impact on the device-to-device communication bearer and on the radio access network.
- Simplicity/limited cost: the above embodiments do not require any new/modified interface with external equipment such as a ProSe Function, a Public Safety Application Server, and/or the like. The embodiments also do not require any additional signalling on top of already existing signalling messages exchanged between the network nodes (i.e. even when new parameters are used, these new parameters may be sent using the existing signalling messages). In addition, the embodiments do not require any change in existing management of AMBR parameters for roaming subscribers.

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above examples, relayed communication paths have been described to use an LTE technology (i.e. the same communication technology that is used between the base station and the relaying user communication device). However, it will be appreciated that a communication path may be relayed using any communication technology, for example, WLAN (Wireless Local Area Network), Wi-Fi (Wireless Fidelity), FlashLinQ, WiMAX (Worldwide Interoperability for Microwave Access), Bluetooth, BLE (Bluetooth Low Energy), ZigBee, etc. (irrespective of the communication technology used between the base station and the relaying user communication device).

It will be appreciated that the base station may comprise a Low Power Node (LPN), such as a home base station, a femto base station, and/or the like. It will also be appreciated that either one of (or both) the relaying and the relayed user communication devices may comprise an LPN.

In the above examples, two user communication devices were allowed to establish a direct D2D connection with each other. As those skilled in the art will appreciate, such connections may be established between three or more user communication devices, such that the users of the communication devices may be connected together in a conference call setup. In this case, a D2D bearer may be provided between three or more user communication devices (e.g. all user communication devices relayed via the same UE-R).

In the above description, a D2D bearer is provided between the relaying user communication device and the relayed user communication device(s) for relaying data. It will be appreciated that such a "D2D bearer" may comprise at least one of: a D2D radio bearer; a D2D EPS bearer; a D2D service bearer; and/or the like.

In the above embodiments, the user equipment comprise mobile (cellular) communication devices. Other types of user communication devices such as, for example, mobile telephones, smartphones, personal digital assistants, laptop computers, web browsers, MTC (Machine Type Communication) devices, etc. could be used.

In the above description of FIGS. 6 and 8, specific signalling messages were given as examples (e.g. "Initial Context Setup" messages). However, it will be appreciated that different signalling messages may also be used, for example any suitable Access Stratum (AS) and/or Non-Access Stratum (NAS) messages and/or non-3GPP messages.

It will be appreciated that some messages may be sent from/to the network at the same time (e.g. combined) and/or messages may be sent at different times, and in a different order than they are presented above.

In the above description of step S616 of FIG. 6 and step S816 of FIG. 8, the MME is described to compute the UE-AMBR/UE-Relay-AMBR parameters after a relay PDN establishment. However, it will be appreciated that the MME may compute the parameters during the PDN connection establishment (at S605/S805) or during the relay PDN connection establishment (at S615/S815) rather than a separate step. It will also be appreciated that the MME may compute the parameters regardless whether or not it has determined that there is a relay connection (i.e. regardless whether or not the second user communication device is configured as a UE-R). In this case, the relay PDN connection establishment step S615/S815 may be omitted.

In the above description of steps S740 and S760 of FIG. 7, and steps S940 and S960 of FIG. 9, the P-GW is described to block transmission of the packet being processed. However, it will be appreciated that the P-GW may block the packet only temporarily. In this case, the packet may be buffered for a predetermined amount of time, e.g. until it is determined that the (relayed) traffic fulfils the condition (of the respective preceding step) for forwarding that packet towards it destination.

In the above description of step S930 of FIG. 9, the P-GW is described to carry out rate enforcement using an AMBR value that defines a maximum additional traffic allowed via the UE-R on top of the UE-R's regular traffic. In FIG. 9, the additional traffic is described to comprise relayed traffic. However, it will be appreciated that the Extra-APN-AMBR parameter and the Extra-UE-AMBR parameter may also be applicable to the UE-R's native traffic. For example, the network operator may apply such "extra" traffic parameters for any user communication device temporarily (rather than in dependence on its relaying functionality), such as when temporary authorization of higher throughput is needed (e.g. for offloading purposes, during night time, and/or whenever the capacity of the network is underused).

It will also be appreciated that a D2D (or ProSe) capable UE may have multiple connections with other UEs, UE-Rs, and/or other D2D UEs, if appropriate.

In the above embodiment, the HSS is described to hold HSS_UE-Relay-AMBR and HSS_APN-Relay-AMBR parameters for the user communication devices. It will be appreciated that a network operator may offer various relaying subscription options to the end users. For example, possible subscription options for relaying may include:

a) A basic category without any relaying subscription option, with the following parameters:
On downlink:
Internet APN: APN-AMBR=10 mbs
UE-AMBR=10 mbs
On uplink:
Internet APN: APN-AMBR=5 mbs
UE-AMBR=5 mbs b) A basic relaying subscription option (e.g. to allow relaying of voice and/or video traffic for up to 5 users), with the following parameters:
On downlink:
GCSE APN (for relaying traffic): APN-Relay-AMBR=2.5 mbs
Internet APN (for normal traffic): APN-AMBR=10 mbs;
Internet APN (for relaying traffic): APN-Relay-AMBR=10 mbs
UE-AMBR=10 mbs
On uplink:
GCSE APN (for relaying traffic): APN-Relay-AMBR=1 mbs
Internet APN (for normal traffic): APN-AMBR=5 mbs;
Internet APN (for relaying traffic): APN-Relay-AMBR=5 mbs
UE-AMBR=5 mbs c) A premium relaying subscription option (e.g. to allow relaying of voice and/or video traffic for up to 10 users), with the following parameters:
On downlink:
GCSE APN (for relaying traffic): APN-Relay-AMBR=5 mbs
Internet APN (for normal traffic): APN-AMBR=10 mbs;
Internet APN (for relaying traffic): APN-Relay-AMBR=20 mbs
UE-AMBR=20 mbs
On uplink:
GCSE APN (for relaying traffic): APN-Relay-AMBR=2 mbs
Internet APN (for normal traffic): APN-AMBR=5 mbs;
Internet APN (for relaying traffic): APN-Relay-AMBR=10 mbs
UE-AMBR=10 mbs.

In addition, subscription options b) and c) may also include an associated UE-Relay-AMBR value as well.

In the above examples described with reference to FIGS. 11 to 13, the GTP-U header/payload is described to include an indication of the type of traffic (native or relayed). However, it will also be appreciated that such an indication may also be applied in other situations as well (i.e. in situations other than AMBR enforcement related), which may require different operation of the base station in dependence on traffic type.

For example, the above described changes to the GTP-U may be beneficially applied in the following cases:
(in downlink) the base station may be configured to apply an appropriate (e.g. different) coding scheme/scheduling for the traffic towards the UE-R in dependence on the indicated traffic type;
(in downlink) the base station may be configured to apply an appropriate (e.g. different) power control for the traffic towards the UE-R in dependence on the indicated traffic type;
(in downlink) the base station may be configured to transmit the traffic towards the UE-R in dependence on the indicated traffic type—for example, the base station may be configured to use an eMBMS bearer for one (or both) of the relayed traffic and the native traffic, when appropriate;
(in uplink) the base station and/or the P-GW may be configured to transmit the traffic from the UE-R to another network node in dependence on the indicated traffic type—for example, the base station and/or the P-GW may be configured to transmit one type of traffic to e.g. a Group Communication System Enablers Application Server (GCSE AS) and to transmit the other type of traffic towards a different entity (e.g. to another P-GW or a user communication device).

It will also be appreciated that the above described relaying specific AMBR parameters (UE-Relay-AMBR, APN-Relay-AMBR, Extra-UE-AMBR, Extra-APN-AMBR, and/or the like) may only be applied to specific services only, e.g. Public Safety related communications, which may need to be prioritised over other services. In this case, it may be possible to improve the transmission/relaying of data relating to such prioritised service by applying an associated relaying specific AMBR parameter to such specific services (and relaying traffic for other, non-prioritised, services using the UE-R's AMBR applicable to its normal communications).

In the above description of FIG. 13, the rate enforcement module of the base station is described to process the data packets using the UE-AMBR parameter (for native traffic) and the UE-Relay AMBR parameter (for relayed or native plus relayed traffic). However, it will be appreciated that data packets may also be processed using the bit rate parameter (Extra-UE-AMBR) for additional traffic on top of the UE-R's native traffic. In this case, the check performed at step S1330 uses the "Extra-UE-AMBR" parameter instead of the "UE-Relay-AMBR" parameter. In this case, it will be appreciated that when the UE-R's bit rate exceeds the value defined by its UE-AMBR, only relayed traffic would be allowed by the rate enforcement module, as long as the total bit rate for the UE-R does not exceed the sum of UE-AMBR and Extra-UE-AMBR.

The above examples have been discussed with reference to UE-R technology. However, it will be appreciated that the examples are also applicable to other fields such as D2D (Device-to-Device), P2P (Peer-to-Peer), and/or P2M (Peer-to-Multipeer) technologies.

In the above description, the UE-R is described as a standalone entity. However, it will be appreciated that the UE-R functionality described above may be implemented using multiple entities. For example, the UE-R functionality may be provided by a plurality of user communication devices connected in a hop-by-hop manner to a base station, using respective D2D/ProSe connections to provide each "hop" between two neighbour user communication devices. It will also be appreciated that the UE-R may be provided in the form of an apparatus, e.g. as a user communication device connected to a wireless router, laptop computer, and/or the like.

In the above description, the user communication devices, the base station, the mobility management entity, and the PDN gateway are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the user communication devices, the base station, the mobility management entity, and the PDN gateway as a signal over a computer network, or on a recording medium. Further, the functionality performed by part or all of this software may be performed using one or more dedicated hardware circuits. However, the use of software modules is preferred as it facilitates the updating of the user communication devices, the base station, the mobility management entity, and the PDN gateway in order to update their functionalities.

The software module (i.e., computer program) can be stored and provided to a computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

It will be appreciated that the following general modifications are also possible.

<Modification A>

The parameters held by the HSS include: HSS_Extra-APN-AMBR and HSS_Extra-UE-AMBR.

The computations by the MME (AMBR configuration module) include:

for the base station:

UE-AMBR=Min[Σ(HSS_APN-AMBR of active APNs),HSS_UE-AMBR]+Min[Σ(Extra-APN-AMBR of active APNs),HSS_Extra-UE-AMBR]

for the P-GW:

APN-AMBR=HSS_Extra-APN-AMBR+HSS_APN-AMBR.

In this case, there is no need for the base station to discriminate between native and relayed traffic for the UE-R when carrying out rate enforcement. Accordingly, a single AMBR value (UE-AMBR) may be used.

In this case, there is no need for the P-GW to discriminate between native and relayed traffic for the UE-R when carrying out rate enforcement. Accordingly, a single AMBR value may be used (e.g. the APN-AMBR value provided by the MME, or a value derived by the P-GW itself by calculating the sum of HSS_Extra-APN-AMBR and HSS_APN-AMBR).

<Modification B>

The parameters held by the HSS include: HSS_Extra-APN-AMBR and HSS_Extra-UE-AMBR.

The computations by the MME (AMBR configuration module) include:

for the base station:

UE-AMBR=Min[Σ(HSS_APN-AMBR of active APNs),HSS_UE-AMBR]+Min[Σ(Extra-APN-AMBR of active APNs),HSS_Extra-UE-AMBR]

for the P-GW:

APN-AMBR=HSS_APN-AMBR and

APN-Relay-AMBR=HSS_Extra-APN-AMBR+HSS_APN-AMBR

In this case, there is no need for the base station to discriminate between native and relayed traffic for the UE-R when carrying out rate enforcement. Accordingly, a single AMBR value (UE-AMBR) may be used.

In this case, the P-GW may distinguish between native and relayed traffic, and apply rate enforcement to each traffic type as follows:

apply APN-AMBR for the UE-R's native traffic; and apply APN-Relay-AMBR for the UE-R's relayed traffic.

<Modification C>

In this case, the P-GW may apply the same packet handling as in modification A or B. However, in this modification the MME computes the value for the Extra-UE-AMBR parameter using the following equation.

Extra-UE-AMBR=Min[Σ(HSS_Extra-APN-AMBR of active APNs),HSS_Extra-UE-AMBR]

The Extra-UE-AMBR parameter defines the maximum total extra traffic allowed for relaying, across all APNs, for a given user communication device.

In this modification, therefore, the base station receives, from the MME, and applies the following two parameters for the UE-R's traffic: i) the UE-AMBR (which may be computed e.g. as: UE-AMBR=Min[Σ(HSS_APN-AMBR of active APNs), HSS_UE-AMBR]); and ii) the Extra-UE-AMBR.

In this case, the base station may distinguish between native and relayed traffic, and apply rate enforcement to each traffic type as follows:

apply UE-AMBR for the UE-R's native and relayed traffic; and apply Extra-UE-AMBR for the UE-R's relayed traffic.

The MME may determine, for each authorised P-GW, the value for the associated APN-AMBR as the following equation.

APN-AMBR=HSS_Extra-APN-AMBR+HSS_APN-AMBR

In this case, there is no need for the P-GW to discriminate between native and relayed traffic for the UE-R when carrying out rate enforcement.

Alternatively, the MME may determine, for each authorised P-GW, the value for the associated APN-AMBR as the following equations.

APN-AMBR=HSS_APN-AMBR and

APN-Relay-AMBR=HSS_Extra-APN-AMBR+HSS_APN-AMBR

In this case, the P-GW may distinguish between native and relayed traffic, and apply rate enforcement to each traffic type as follows:

apply APN-AMBR for the UE-R's native traffic; and apply APN-Relay-AMBR for the UE-R's relayed traffic.

<Modification D>

In this modification, the HSS_Extra-APN-AMBR parameter defines the amount of additional allowed bandwidth that can be added to the normal bandwidth (APN-AMBR) for a particular APN, when relaying.

Optionally, a new HSS parameter may also be defined, per user communication device, e.g. an HSS_Extra-UE-AMBR parameter defining the maximum allowed value for the UE-AMBR parameter, when a user communication device is relaying data.

Thus, when the MME detects that the user communication device is relaying traffic for other user communication device, it can increment the APN-AMBR value by the HSS_Extra-APN-AMBR (i.e. new APN-AMBR=APN-AMBR+HSS_Extra-APN-AMBR). In this case, the MME may also increment the UE-AMBR by the HSS_Extra-UE-AMBR (i.e. new UE-AMBR=UE-AMBR+HSS_Extra-UE-AMBR).

It is noted that in this case, the P-GW does not need to be able to distinguish between native and relayed traffic.

<Modification E>

It will be appreciated that the MME may retrieve relaying-related AMBR parameters from a ProSe Function, e.g. during establishment of the relay PDN connection, such as AMBR parameters (UE-AMBR/APN-AMBR) associated with the relayed user communication device for which the relay PDN is being established. Such a ProSe Function may be provided within or outside of the core network, and may be provided with a connection to the MME and/or the HSS.

Various other modifications will be apparent to those skilled in the art and will not be described in further detail here.

Glossary of 3GPP Terms

AMBR—Aggregate Maximum Bit Rate
APN—Access Point Name
AS—Access Stratum
D2D—Device to Device
DL—Downlink
eNB—Evolved Node B, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
GBR—Guaranteed Bit Rate
GCSE—Group Communication System Enablers
GPRS—General Packet Radio Service
GTP—GPRS Tunnelling Protocol
HSS—Home Subscriber Server
LTE—Long Term Evolution (of UTRAN)
MME—Mobility Management Entity
NAS—Non-Access-Stratum
P-GW—PDN Gateway
ProSe—Proximity-based Services
(E-)RAB—(EPS-) Radio Access Bearer
RRC—Radio Resource Control
S-GW—Serving Gateway
TFT—Traffic Flow Template
UE—User Equipment
UE-R—UE Relay
UL—Uplink
UMTS—Universal Mobile Telecommunications System This application is based upon and claims the benefit of priority from United Kingdom patent application No. 1404961.3, filed on Mar. 19, 2014, the disclosure of which is incorporated herein in its entirety by reference.

REFERENCE SIGNS LIST

1 COMMUNICATION NETWORK
3 UE, USER COMMUNICATION DEVICE
5 BASE STATION
7 CORE NETWORK
10 EXTERNAL NETWORK
11 MME
13 S-GW
14 P-GW
16 HSS
31, 51, 71, 91 TRANSCEIVER CIRCUIT
33, 53 ANTENNA
35 USER INTERFACE
37, 57, 77, 97 CONTROLLER
39, 59, 79, 99 MEMORY
41, 61, 81, 101 OPERATING SYSTEM
43, 63, 83, 103 COMMUNICATION CONTROL MODULE
45 EPS MODULE
48 D2D MODULE
49 RELAY MODULE
55, 75, 95 NETWORK INTERFACE
65, 105 RATE ENFORCEMENT MODULE
66 PDCP MODULE
67 MAC MODULE
68, 108 GTP-U MODULE
85 AMBR CONFIGURATION MODULE

The invention claimed is:

1. A core network node comprising:
   at least one memory storing instructions;
   at least one processor configured to execute the instructions to:
      generate first configuration data identifying a first aggregated maximum bit rate (AMBR) for communications with a relaying user device when said relaying user device does not have a relaying connection with at least one other user communication device; and
      generate second configuration data identifying a second AMBR for communications with said relaying user device when said relaying user device does have a relaying connection with at least one other user communication device; and
   transceiver circuitry for communicating said first and second configuration data to another network node for managing communications with said relaying user device.

2. The core network node according to claim 1, wherein said second AMBR comprises an updated version of said first AMBR.

3. The core network node according to claim 1, wherein said other network node comprises a base station, and
   wherein said at least one processor is configured to execute the instructions to generate said second AMBR as the sum of:
      i) the smaller of: a total of all allowed non-relayed data throughputs for said relaying user device via each active access point serving said relaying user device; and a total allowed non-relayed data throughput for communications for said relaying user device; and
      ii) the smaller of: the total of allowed relayed data throughputs for said relaying user device via each active access point serving said relaying user device; and the total allowed relayed data throughput for communications for said relaying user device.

4. The core network node according to claim 3, wherein said at least one processor is configured to execute the instructions to generate said second AMBR using the following equation:

UE-AMBR=Min[Σ(HSS_APN-AMBR of all serving access points),HSS_UE-AMBR]+Min[Σ(HSS_APN-Relay-AMBR of relaying access points),HSS_UE-Relay-AMBR]

wherein "UE-AMBR" is said second AMBR; "HSS_APN-AMBR" is the allowed non-relayed data throughput for said relaying user device via a particular access point; "HSS_UE-AMBR" is the total allowed non-relayed data throughput for communications for said relaying user device; "HSS_APN-Relay-AMBR" is the allowed relayed data throughput for said relaying user device via a particular access point; "HSS_UE-Relay-AMBR" is the total allowed relayed data throughput for communications for said relaying user device.

5. The core network node according to claim 3, wherein said transceiver circuitry is configured to receive information identifying said allowed relayed data throughput for said relaying user device via a particular access point (HSS_APN-Relay-AMBR) and information identifying said total allowed relayed data throughput for communications for said relaying user device (HSS_UE-Relay-AMBR) from a home subscriber server, HSS.

6. The core network node according to claim 1, wherein said first AMBR comprises an AMBR for controlling a total data throughput for communications with said relaying user device when said relaying user device does not have a relaying connection with at least one other user communication device; and said second AMBR comprises a dedicated AMBR for controlling relayed data throughput, but not non-relayed data throughput, for communications with said relaying user device.

7. The core network node according to claim 6, wherein second configuration data identifies a further AMBR for controlling non-relayed ("native") data throughput, but not relayed ("non-native") data throughput, for communications with said relaying user device, when said relaying user device does have a relaying connection with at least one other user communication device.

8. The core network node according to claim 6, wherein second configuration data identifies a further AMBR for controlling both non-relayed ("native") data throughput and relayed ("non-native") data throughput for communications with said relaying user device, when said relaying user device does have a relaying connection with at least one other user communication device.

9. The core network node according to claim 1, wherein said other network node comprises a base station, and wherein said at least one processor is configured to execute the instructions to generate said second AMBR by selecting the smaller of: the total of allowed relayed data throughputs for said relaying user device via each active access point serving said relaying user device; and the total allowed relayed data throughput for communications for said relaying user device.

10. The core network node according to claim 9, wherein said at least one processor is configured to execute the instructions to generate said second AMBR using the following equation:

UE-Relay-AMBR=Min[(HSS_APN-Relay-AMBR of all serving access points),HSS_UE-Relay-AMBR]

wherein "UE-Relay-AMBR" is said second AMBR; "HSS_APN-Relay-AMBR" is the allowed relayed data throughput for said relaying user device via a particular access point; "HSS_UE-Relay-AMBR" is the total allowed relayed data throughput for communications for said relaying user device.

11. The core network node according to claim 1, wherein said other network node comprises an access point, and wherein said at least one processor is configured to execute the instructions to generate said second AMBR as the sum of:
   i) an allowed native data throughput for said relaying user device via said access point, wherein native data comprises data originated by or destined for said relaying user device; and
   ii) an allowed additional data throughput for said relaying user device via said access point.

12. The core network node according to claim 11, wherein said at least one processor is configured to execute the instructions to generate said second AMBR using the following equation:

APN-AMBR=HSS_APN-AMBR+HSS_Extra-APN-AMBR wherein "APN-AMBR" is said second AMBR; "HSS_APN-AMBR" is the allowed native data throughput for said relaying user device via said access point; "HSS_Extra-APN-AMBR" is the allowed additional data throughput for said relaying user device via said access point.

13. The core network node according to claim 12, wherein said transceiver circuitry is configured to receive information identifying said allowed additional data throughput for said relaying user device via said access point (HSS_Extra-APN-AMBR) from a home subscriber server, HSS.

14. The core network node according to claim 1, wherein said at least one processor is configured to execute the instructions to determine the presence of a relaying connection via said relaying user device; and wherein said transceiver circuitry is configured to send, to said other network node:
   said first configuration data when said at least one processor determines that a relaying connection via said relaying user device is not present; and
   said second configuration data when said at least one processor determines that a relaying connection via said relaying user device is present.

15. The core network node according to claim 1, wherein said second configuration data is configured to identify at least one of:
   a second downlink AMBR for communications for said relaying user device when said relaying user device does not have a relaying connection with at least one other user communication device; and
   a second uplink AMBR for communications for said relaying user device when said relaying user device does not have a relaying connection with at least one other user communication device.

16. The core network node according to claim 1, comprising a mobility management entity, MME.

17. Base station apparatus for facilitating communications between a core network and a relaying user device, the relaying user device being configured for relaying data for at least one other user device, the base station apparatus comprising:
   transceiver circuitry for communicating with said core network and with said relaying user device, wherein the transceiver circuitry is configured to receive, from said core network:
      first configuration data identifying a first aggregated maximum bit rate (AMBR) for communications with said relaying user device when said relaying user device does not have a relaying connection with at least one other user communication device; and
      second configuration data identifying a second AMBR for communications with said relaying user device when said relaying user device does have a relaying connection with at least one other user communication device;
   at least one memory storing instructions; and
   at least one processor configured to execute the instructions to manage communications with said relaying user device:
      based on said first AMBR when said relaying user device does not have a relaying connection with at least one other user communication device; and
      based on said second AMBR when said relaying user device does have a relaying connection with at least one other user communication device.

18. The base station apparatus according to claim 17, wherein said second AMBR comprises an updated version of said first AMBR.

19. The base station apparatus according to claim 17, wherein said first AMBR comprises an AMBR for controlling a total data throughput for communications with said relaying user device when said relaying user device does not have a relaying connection with at least one other user communication device; and said second AMBR comprises a dedicated AMBR for controlling relayed data throughput, but not non-relayed data throughput, for communications with said relaying user device.

20. The base station apparatus according to claim 19, wherein second configuration data identifies a further AMBR for controlling non-relayed ("native") data throughput, but not relayed ("non-native") data throughput, for communications with said relaying user device, when said relaying user device does have a relaying connection with at least one other user communication device.

21. The base station apparatus according to claim 20, wherein said at least one processor is configured to execute the instructions to manage communications with said relaying user device based on said second AMBR and said further AMBR when said relaying user device does have a relaying connection with at least one other user communication device.

22. The base station apparatus according to claim 20, wherein said at least one processor is configured to execute the instructions to determine, on processing a data packet to be communicated for said relaying user device, whether said data packet comprises relayed data or non-relayed data; and wherein said at least one processor is configured to execute the instructions to manage communicating said data packet for said relaying user device based on said determination and said second AMBR and further AMBR.

23. The base station apparatus according to claim 22, wherein said transceiver circuitry is configured to receive at least one of: relayed data packets including an information element set to indicate that said data packets are relayed; and non-relayed ("native") data packets including an information element set to indicate that said data packets are not relayed; and wherein said at least one processor is configured to execute the instructions to perform said determination of whether said data packet comprises relayed data or non-relayed data based on whether or not said data packet includes an information element set to indicate that said data packet is a relayed or a native data packet.

24. The base station apparatus according to claim 23, wherein said transceiver circuitry is configured to receive said at least one of relayed data packets and non-relayed ("native") data packets from the core network.

25. The base station apparatus according to claim 24, wherein said information element set to indicate that said data packets are relayed and/or said information element set to indicate that said data packets are not relayed comprises an information element conforming to the GPRS (General Packet Radio Service) Tunnelling Protocol, GTP.

26. The base station apparatus according to claim 25, wherein said information element and/or said further information element comprises at least one of:
   information identifying a GTP version number;
   a flag for indicating whether or not said data packets are relayed;

information identifying a GTP message type;
information identifying the presence of a GTP extension header; and
a GTP extension header.

27. The base station apparatus according to claim 23,
wherein said transceiver circuitry is configured to receive said at least one of relayed data packets and non-relayed ("native") data packets from the relaying user device when the relaying user device has a relaying connection with at least one other user communication device.

28. The base station apparatus according to claim 27, wherein said information element set to indicate that said data packets are relayed and/or said information element set to indicate that said data packets are not relayed comprises an information element conforming to the Packet Data Convergence Protocol, PDCP, such as a field of a PDCP header.

29. The base station apparatus according to claim 27, wherein said information element set to indicate that said data packets are relayed and/or said information element set to indicate that said data packets are not relayed comprises an information element conforming to the Media Access Control, MAC, protocol such as a MAC control element.

30. The base station apparatus according to claim 22,
wherein said transceiver circuitry is configured to receive, from said relaying user device at least one of:
a request for an allocation of communication resources for relayed data communication the request including an information element set to indicate that said request is for relayed data communication; and
a request for an allocation of communication resources for non-relayed ("native") data communication the request including an information element set to indicate that said request is for non-relayed ("native") data communication; and
wherein said determination of whether said data packet comprises relayed data or non-relayed data is based on whether said data packet is communicated using resources allocated for communicating relayed data, or allocated for communicating non-relayed ("native") data, responsive to said request(s) for an allocation of communication resources.

31. The base station apparatus according to claim 30,
wherein said at least one processor is configured to execute the instructions, on processing a data packet to be communicated for said relaying user device, to modify said data packets by including a further information element conforming to the GTP and set to indicate that said data packet is relayed and/or set to indicate that said data packets is not relayed, and wherein said transceiver circuitry is configured to forward said modified data packet to said core network.

32. The base station apparatus according to claim 22,
wherein said at least one processor is configured to execute the instructions to allocate resources responsive to said request(s) and to maintain, based on said information element(s) in said request(s), information identifying at least one of: communication resources allocated for relayed data communication; and communication resources allocated for non-relayed ("native") data communication.

33. The base station apparatus according to claim 19,
wherein second configuration data identifies a further AMBR for controlling both non-relayed ("native") data throughput and relayed ("non-native") data throughput for communications with said relaying user device, when said relaying user device does have a relaying connection with at least one other user communication device.

34. The base station apparatus according to claim 17, wherein said second configuration data is configured to identify at least one of:
a second downlink AMBR for communications for said relaying user device when said relaying user device does not have a relaying connection with at least one other user communication device; and
a second uplink AMBR for communications for said relaying user device when said relaying user device does not have a relaying connection with at least one other user communication device.

35. The base station apparatus according to claim 17, comprising a base station in accordance with the long term evolution, LTE, set of standards.

36. An access point in a core network, the access point comprising:
transceiver circuitry for communicating with a core network entity and with said relaying user device, wherein the transceiver circuitry is configured to receive, from said core network entity:
first configuration data identifying a first aggregated maximum bit rate (AMBR) for communications with said relaying user device when said relaying user device does not have a relaying connection with at least one other user communication device; and
second configuration data identifying a second AMBR for communications with said relaying user device when said relaying user device does have a relaying connection with at least one other user communication device;
at least one memory storing instructions; and
at least one processor configured to execute the instructions to manage communications with said relaying user device:
based on said first AMBR when said relaying user device does not have a relaying connection with at least one other user communication device; and
based on said second AMBR when said relaying user device does have a relaying connection with at least one other user communication device.

37. The access point according to claim 36,
wherein said second AMBR comprises an updated version of said first AMBR.

38. The access point according to claim 36,
wherein said first AMBR comprises an AMBR for controlling a total data throughput for communications with said relaying user device when said relaying user device does not have a relaying connection with at least one other user communication device; and said second AMBR comprises a dedicated AMBR for controlling relayed data throughput, but not non-relayed data throughput, for communications with said relaying user device.

39. The access point according to claim 38,
wherein said second configuration data identifies a further AMBR for controlling non-relayed ("native") data throughput, but not relayed ("non-native") data throughput, for communications with said relaying user device, when said relaying user device does have a relaying connection with at least one other user communication device.

40. The access point according to claim 39,
wherein said at least one processor is configured to execute the instructions to determine, on processing a data packet to be communicated for said relaying user device, whether said data packet comprises relayed data or non-relayed data; and wherein said at least one processor is configured to execute the instructions to manage communicating said data packet for said relaying user device based on said determination and said second AMBR and further AMBR.

41. The access point according to claim 40, wherein said at least one processor is configured to execute the instructions to add to said data packet, upon forwarding said data packet towards said relaying user device:
   i) an information element set to indicate that said data packet is a relayed when said data packet is determined to comprise relayed data; and
   ii) an information element set to indicate that said data packet is a native data packet when said data packet is determined to comprise non-relayed data.

42. The access point according to claim 36, wherein said second configuration data identifies a further AMBR for controlling both non-relayed ("native") data throughput and relayed ("non-native") data throughput for communications with said relaying user device, when said relaying user device does have a relaying connection with at least one other user communication device.

43. The access point according to claim 36, wherein said second configuration data is configured to identify at least one of:
   a second downlink AMBR for communications for said relaying user device when said relaying user device does not have a relaying connection with at least one other user communication device; and
   a second uplink AMBR for communications for said relaying user device when said relaying user device does not have a relaying connection with at least one other user communication device.

44. The access point according to claim 36, comprising a packet data network, PDN, gateway.

45. A core network node comprising:
   at least one memory storing instructions;
   at least one processor configured to execute the instructions to hold parameters for controlling communications for a relaying user device, wherein said parameters comprise:
      a first aggregated maximum bit rate (AMBR) for communications for said relaying user device when said relaying user device does not have a relaying connection with at least one other user communication device; and
      a second AMBR for communications for said relaying user device when said relaying user device does have a relaying connection with at least one other user communication device; and
   transceiver circuitry for providing said parameters to a mobility management entity for controlling communications between said relaying user device and said core network.

46. The core network node according to claim 45, wherein said at least one processor is configured to hold at least one of:
   a second downlink AMBR for communications for said relaying user device when said relaying user device does not have a relaying connection with at least one other user communication device; and
   a second uplink AMBR for communications for said relaying user device when said relaying user device does not have a relaying connection with at least one other user communication device.

47. The core network node according to claim 45, comprising a home subscriber server, HSS.

48. An access point in a core network, the access point comprising:
   transceiver circuitry for communicating with a relaying user device, wherein the transceiver circuitry is configured to receive data packets from said relaying user device;
   at least one memory storing instructions; and
   at least one processor configured to execute the instructions to
      determine, upon processing a data packet of said received data packets, whether said data packet is a relayed data packet; and
      manage communications for said relaying user device based on said determination,
   wherein said transceiver circuitry is configured to obtain configuration data identifying an aggregated maximum bit rate (AMBR) for communications with said relaying user device when said relaying user device has a relaying connection with another user communication device, and
   wherein said at least one processor is configured to execute the instructions to manage communications for said relaying user device based on said AMBR when said data packet is determined to be a relayed data packet.

49. The access point according to claim 48 comprising a packet data network gateway, P-GW.

50. A system comprising:
   a base station apparatus for facilitating communications between a core network and a relaying user device, the relaying user device being configured for relaying data for at least one other user device, the base station apparatus comprising:
      first transceiver circuitry for communicating with said core network and with said relaying user device, wherein the first transceiver circuitry is configured to receive, from said core network:
         first configuration data identifying a first aggregated maximum bit rate (AMBR) for communications with said relaying user device when said relaying user device does not have a relaying connection with at least one other user communication device; and
         second configuration data identifying a second AMBR for communications with said relaying user device when said relaying user device does have a relaying connection with at least one other user communication device;
      at least one first memory storing instructions; and
      at least one first processor configured to execute the instructions to manage communications with said relaying user device:
         based on said first AMBR when said relaying user device does not have a relaying connection with at least one other user communication device; and
         based on said second AMBR when said relaying user device does have a relaying connection with at least one other user communication device;
   an access point in a core network, the access point comprising:
      second transceiver circuitry for communicating with a core network entity and with said relaying user device, wherein the second transceiver circuitry is configured to receive, from said core network entity:
first configuration data identifying a first AMBR for communications with said relaying user device when said relaying user device does not have a relaying connection with at least one other user communication device; and
second configuration data identifying a second AMBR for communications with said relaying user device when said relaying user device does have a relaying connection with at least one other user communication device;
at least one second memory storing instructions; and
at least one second processor configured to execute the instructions to manage communications with said relaying user device:
based on said first AMBR when said relaying user device does not have a relaying connection with at least one other user communication device; and
based on said second AMBR when said relaying user device does have a relaying connection with at least one other user communication device;
a core network node comprising:
at least one third memory storing instructions; and
at least one third processor configured to execute the instructions to hold parameters for controlling communications for a relaying user device, wherein said parameters comprise:
a first AMBR for communications for said relaying user device when said relaying user device does not have a relaying connection with at least one other user communication device; and
a second AMBR for communications for said relaying user device when said relaying user device does have a relaying connection with at least one other user communication device; and
third transceiver circuitry for providing said information to a mobility management entity for controlling communications between said relaying user device and said core network; and
a relaying user device comprising:
fourth transceiver circuitry for communicating with a base station and with at least one other user device, wherein the fourth transceiver circuitry is configured: to receive data packets from the at least one other user device for relaying to the base station; and to transmit said received data packets, as relayed data packets, towards said base station;
at least one fourth memory storing instructions; and
at least one fourth processor configured to execute the instructions to include in said relayed data packets information identifying that said relayed data packets are relayed data packets.

51. A method performed by a core network node, the method comprising:
generating:
first configuration data identifying a first aggregated maximum bit rate (AMBR) for communications with a relaying user device when said relaying user device does not have a relaying connection with at least one other user communication device; and
second configuration data identifying a second AMBR for communications with said relaying user device when said relaying user device does have a relaying connection with at least one other user communication device; and
communicating said first and second configuration data to another network node for managing communications with said relaying user device.

52. A non-transitory computer readable media that stores a computer program product including instructions for causing a computer-programmable device to perform a method according to claim 51.

53. A method performed by a base station apparatus for facilitating communications between a core network and a relaying user device, the relaying user device being configured for relaying data for at least one other user device, the method comprising:
receiving, from said core network:
first configuration data identifying a first aggregated maximum bit rate (AMBR) for communications with said relaying user device when said relaying user device does not have a relaying connection with at least one other user communication device; and
second configuration data identifying a second AMBR for communications with said relaying user device when said relaying user device does have a relaying connection with at least one other user communication device; and
managing communications with said relaying user device:
based on said first AMBR when said relaying user device does not have a relaying connection with at least one other user communication device; and
based on said second AMBR when said relaying user device does have a relaying connection with at least one other user communication device.

54. A method performed by an access point in a core network, the method comprising:
receiving, from said core network:
first configuration data identifying a first aggregated maximum bit rate (AMBR) for communications with said relaying user device when said relaying user device does not have a relaying connection with at least one other user communication device; and
second configuration data identifying a second AMBR for communications with said relaying user device when said relaying user device does have a relaying connection with at least one other user communication device; and
managing communications with said relaying user device:
based on said first AMBR when said relaying user device does not have a relaying connection with at least one other user communication device; and
based on said second AMBR when said relaying user device does have a relaying connection with at least one other user communication device.

55. A method performed by a core network node, the method comprising:
holding parameters for controlling communications for a relaying user device, wherein said parameters comprise:
a first aggregated maximum bit rate (AMBR) for communications for said relaying user device when said relaying user device does not have a relaying connection with at least one other user communication device; and
a second AMBR for communications for said relaying user device when said relaying user device does have a relaying connection with at least one other user communication device; and
providing said information to a mobility management entity for controlling communications between said relaying user device and said core network.

56. A method performed by an access point, in a core network, for communicating with a relaying user device, the method comprising:
- obtaining configuration data identifying an aggregated maximum bit rate (AMBR) for communications with said relaying user device when said relaying user device has a relaying connection with another user communication device;
- receiving data packets from said relaying user device;
- processing a data packet of said received data packets;
- determining, upon processing a data packet of said received data packets, whether said data packet is a relayed data packet; and
- managing communications for said relaying user device based on a result of said determination, based on said AMBR when said data packet is determined to be a relayed data packet.

* * * * *